US010318010B2

(12) United States Patent
Horowitz

(10) Patent No.: US 10,318,010 B2
(45) Date of Patent: *Jun. 11, 2019

(54) THREE DIMENSIONAL (3D) MODELING OF A COMPLEX CONTROL OBJECT

(71) Applicant: Leap Motion, Inc., San Francisco, CA (US)

(72) Inventor: Kevin A. Horowitz, San Francisco, CA (US)

(73) Assignee: Leap Motion, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/888,965

(22) Filed: Feb. 5, 2018

(65) Prior Publication Data

US 2018/0329509 A1 Nov. 15, 2018

Related U.S. Application Data

(63) Continuation of application No. 15/588,138, filed on May 5, 2017, now Pat. No. 9,886,097, which is a
(Continued)

(51) Int. Cl.
*G06F 3/01* (2006.01)
*G06T 7/246* (2017.01)
*G06K 9/00* (2006.01)

(52) U.S. Cl.
CPC ......... *G06F 3/017* (2013.01); *G06K 9/00214* (2013.01); *G06K 9/00389* (2013.01); *G06T 7/246* (2017.01); *G06T 7/248* (2017.01); *G06T 7/251* (2017.01); *G06T 2207/10028* (2013.01); *G06T 2207/30196* (2013.01)

(58) Field of Classification Search
None
See application file for complete search history.

(56) References Cited

U.S. PATENT DOCUMENTS 6,788,809 B1 9/2004 Grzeszczuk et al.
2009/0103780 A1 4/2009 Nishihara et al.
(Continued)

OTHER PUBLICATIONS

Hoshino, Kiyoshi, "Copycat Hand—Robot Hand Generating Imitative Behaviour at High Speed and with High Accuracy", 2007, 17 pgs.
(Continued)

*Primary Examiner* — Matthew C Bella
*Assistant Examiner* — Brian D Shin
(74) *Attorney, Agent, or Firm* — Haynes Beffel & Wolfeld LLP; Ernest J. Beffel, Jr.

(57) ABSTRACT

The technology disclosed relates to automatically (e.g., programmatically) initializing predictive information for tracking a complex control object (e.g., hand, hand and tool combination, robot end effector) based upon information about characteristics of the object determined from sets of collected observed information. Automated initialization techniques obviate the need for special and often bizarre start-up rituals (place your hands on the screen at the places indicated during a full moon, and so forth) required by conventional techniques. In implementations, systems can refine initial predictive information to reflect an observed condition based on comparison of the observed with an analysis of sets of collected observed information.

19 Claims, 24 Drawing Sheets

Related U.S. Application Data continuation of application No. 14/732,616, filed on Jun. 5, 2015, now Pat. No. 9,646,201.

(60) Provisional application No. 62/008,438, filed on Jun. 5, 2014.

(56) References Cited

U.S. PATENT DOCUMENTS

| | | |
|---|---|---|
| 2013/0182908 A1 | 7/2013 | Nishimura et al. |
| 2013/0336524 A1 | 12/2013 | Zhang et al. |

OTHER PUBLICATIONS

U.S. Appl. No. 14/732,616—Office Action dated Sep. 8, 2016, 24 pages.
Parker, James R., et al., "Finger Recognition for Hand Pose Determination", Nov. 2009, 19 pages.
U.S. Appl. No. 14/732,616—Response to Office Action dated dated Sep. 8, 2016 filed Dec. 7, 2016, 12 pages.
U.S. Appl. No. 14/732,616—Notice of Allowance dated Jan. 13, 2017, 8 pages.
U.S. Appl. No. 15/588,138—Office Action dated Jun. 16, 2017, 16 pages.
U.S. Appl. No. 15/588,138—Response to Office Action dated Jun. 16, 2017 filed Sep. 18, 2017, 10 pages.
U.S. Appl. No. 15/588,138—Notice of Allowance dated Oct. 4, 2017, 10 pages.

Extract initialization parameter by combining average direction of plane normals with normal vector defining plane of best-fit through plurality of contours. Take cross-product to derive three vectors that comprise initialization parameter.

THREE DIMENSIONAL (3D) MODELING OF A COMPLEX CONTROL OBJECT

PRIORITY DATA

This application is a continuation of U.S. patent application Ser. No. 15/588,138, entitled, "THREE DIMENSIONAL (3D) MODELING OF A COMPLEX CONTROL OBJECT," filed on 5 May 2017, which is a continuation of U.S. patent application Ser. No. 14/732,616, entitled, "THREE DIMENSIONAL (3D) MODELING OF A COMPLEX CONTROL OBJECT," filed on 5 Jun. 2015, which applications are incorporated herein by reference for all purposes.

The U.S. patent application Ser. No. 14/732,616 claims the benefit of U.S. Provisional Patent Application No. 62/008,438, entitled, "INITIALIZING PREDICTIVE INFORMATION FOR FREE SPACE GESTURE CONTROL AND COMMUNICATION," filed on 5 Jun. 2014. The provisional application is hereby incorporated by reference for all purposes.

FIELD OF THE TECHNOLOGY DISCLOSED

The technology disclosed relates, in general, to human machine interface and in particular to initializing predictive information for capturing motions of objects in three-dimensional space.

INCORPORATIONS

Materials incorporated by reference in this filing include the following:

PREDICTIVE INFORMATION FOR FREE SPACE GESTURE CONTROL AND COMMUNICATION, U.S. Prov. App. No. 61/871,790, filed 29 Aug. 2013, PREDICTIVE INFORMATION FOR FREE-SPACE GESTURE CONTROL AND COMMUNICATION, U.S. Prov. App. No. 61/873,758, filed 4 Sep. 2013, PREDICTIVE INFORMATION FOR FREE SPACE GESTURE CONTROL AND COMMUNICATION, U.S. Prov. App. No. 61/898,462, filed 31 Oct. 2013, INITIALIZING PREDICTIVE INFORMATION FOR FREE SPACE GESTURE CONTROL AND COMMUNICATION, U.S. Prov. App. No. 61/911,975, filed 4 Dec. 2013, INITIALIZING ORIENTATION IN SPACE FOR PREDICTIVE INFORMATION FOR FREE SPACE GESTURE CONTROL AND COMMUNICATION, U.S. Prov. App. No. 61/924,193, filed 6 Jan. 2014, DYNAMIC USER INTERACTIONS FOR DISPLAY CONTROL, U.S. Non-Prov. application Ser. No. 14/214,336, filed 14 Mar. 2014, RESOURCE-RESPONSIVE MOTION CAPTURE, U.S. Non-Prov. application Ser. No. 14/214,569, filed 14 Mar. 2014, DRIFT CANCELATION FOR PORTABLE OBJECT DETECTION AND TRACKING, U.S. Prov. App. No. 61/938,635, filed 11 Feb. 2014, and BIOMETRIC AWARE OBJECT DETECTION AND TRACKING, U.S. Prov. App. No. 61/952,843, filed 13 Mar. 2014.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

There has been a growing interest in developing natural interactions with electronic devices that facilitate intuitiveness and enhance user experience. For instance, a user might want to control a surgical robot performing open heart surgery in another room, or a wafer processing machine in a remote clean room environment, or adjust the music volume while cooking with a free-form gesture in the air, or change the song playing on an entertainment system in the living room while cooking, or turn up the thermostat while in bed, or switch on a lamp while sitting on a couch.

Existing techniques that utilize conventional motion capture approaches may rely on markers or sensors worn by the subject while executing activities and/or on the strategic placement of numerous bulky and/or complex equipment in specialized smart home environments to capture subject movements. Unfortunately, such systems tend to be expensive to construct. In addition, markers or sensors worn by the subject can be cumbersome and interfere with the subject's natural movement. Further, systems involving large amounts of hardware tend not to operate in real time, due to the volume of data that needs to be analyzed and correlated. Yet further, how would such a system know where to begin—is the subject close or far away? Standing or lying down? Such considerations have limited the deployment and use of motion capture technology.

Consequently, there is a need for improved techniques to capture motion of objects in real time without attaching sensors or markers thereto.

SUMMARY

The technology disclosed relates to automatically (e.g., programmatically) initializing predictive information for tracking a complex control object (e.g., hand or other body portion, hand and tool combination, robot end effector) based upon information about characteristics of the object determined from sets of collected observed information. Automated initialization techniques obviate the need for special and often bizarre start-up rituals (place your hands on the screen at the places indicated during a full moon, and so forth) required by conventional techniques. In implementations, systems can refine initial predictive information to reflect an observed condition based on comparison of the observed with an analysis of sets of collected observed information.

Predictive information can comprise radial solids (e.g., "capsules") and/or other shapes includable in a model. Implementations can enable conformance of the model to real world changes in a control object (i.e., object being modeled) facilitating real time or near real time control, communication and/or interaction with machines. Inputs can be interpreted from one or a sequence of images, scans, and so forth in conjunction with receiving input, commands, communications and/or other user-machine interfacing, gathering information about objects, events and/or actions existing or occurring within an area being explored, monitored, or controlled, and/or combinations thereof.

In one implementation, described is a method of initializing predictive information that models a complex control object in a three dimensional (3D) sensory space. The method includes accessing observed information including a set of contour points corresponding to surface points at along an outline of a complex control object in a three dimensional (3D) sensory space and transforming the set of contour points to a normalized orientation of the control object.

In some implementations, normalizing orientation of the complex control object further includes at training time t0, sensing an actual position of at least one complex control object in a first reference frame of the 3D sensory space. It includes, at initialization time t1, sensing, in the 3D sensory space, an apparent position of the complex control object different from the actual position, wherein the complex control object has not moved in the 3D sensory space between t0 and t1. It also includes calculating a second reference frame that accounts for apparent position of the complex control object and calculating a transformation that renders the actual position in the first reference frame and the apparent position in the second reference frame into a common reference frame. It further includes transforming the actual and apparent positions of the complex control object into the common reference frame, wherein the common reference frame has a fixed point of reference and an initial orientation of axes, whereby the sensed apparent position is transformed to an actual position. In one implementation, the common reference frame is a world reference frame that does not change.

In other implementations, the transforming the actual and apparent positions of the complex control object into the common reference frame further includes applying an affine transformation.

In yet other implementations, the transforming further includes at least one of applying a vector to the set of contour points and applying a rotation matrix to the set of contour points.

In one implementation, the orientation of the complex control object is determined at the actual position with respect to the first reference frame. In another implementation, the orientation of the complex control object is determined at the apparent position with respect to the second reference frame.

In one implementation, a position of the complex control object is determined at the actual position by calculating a translation of the complex control object with respect to the common reference frame. In another implementation, a position of the complex control object is determined at the apparent position by calculating a translation of the complex control object with respect to the common reference frame.

The method also includes searching a plurality of observed information archetypes that represent poses of the control object in the normalized orientation and selecting an archetype. The poses include arrangement of features of the complex control object and a perspective of observing the complex control object.

In some implementations, the searching further includes traversing a linked data structure including the plurality of observed information archetypes. In one implementation, the traversing further includes visiting a node in the data structure, comparing the transformed contour points sets to one or more pluralities of observed information archetypes associated with the node, and selecting, from the pluralities, at least one archetype having highest conformance with the transformed contour points sets of the control object.

In other implementations, the linked data structure includes a plurality of nodes representing observed information archetypes in parent-child relationship and the traversing further includes visiting a plurality of parent nodes, each parent node in the plurality identifying one or more variants of one or more poses, and calculating a ranked list of parent nodes having highest conformance with the transformed contour points sets of the control object and visiting a plurality of child nodes related to the parent nodes in the ranked list, each child node identifying one or more variants of one or more poses different from the one or more poses of the parent nodes, and calculating a ranked list of child nodes having highest conformance with the transformed contour points sets of the control object.

The method further includes initializing predictive information that models the complex control object from initialization parameters associated with the selected archetype. The initializing predictive information further includes aligning one or more model portions based at least in part upon one or more initialization parameters associated with the selected archetype.

In one implementation, the complex control object is a hand and the initialization parameters include edge information for at least fingers of the hand.

In another implementation, the complex control object is a hand and the initialization parameters include edge information for a palm of the hand.

In yet another implementation, the complex control object is a hand and the initialization parameters include finger segment length information for fingers of the hand.

In yet further implementation, the complex control object is a hand and the initialization parameters include at least one of one or more joint angles between finger segments of fingers of the hand, a pitch angle between finger segments of fingers of the hand, and a yaw angle between finger segments of fingers of the hand.

In a further implementation, the complex control object is a hand and the initialization parameters include joint angle and segment orientation information of the hand.

In another implementation, the complex control object is a hand and the initialization parameters include a distance between adjoining base points of fingers of the hand.

In an implementation, the complex control object is a hand and the initialization parameters include a ratio of distance between adjoining base points of fingers of the hand to minimal distance between adjoining base points of the fingers.

In a further implementation, the complex control object is a hand and the initialization parameters include an angle between adjacent fingers of the hand.

In one implementation, the complex control object is a hand and the initialization parameters include a joint angle between adjacent finger segments of the hand.

In yet another implementation, the complex control object is a hand and the initialization parameters include a ratio of hand's fingers' thickness to a maximal finger's thickness.

In yet further implementation, the complex control object is a hand and the initialization parameters include span lengths between opposing sides of the hand.

In another implementation, the complex control object is a hand and the initialization parameters include at least one of finger diameter length fingers of the hand, palm length of palm of the hand, palm to thumb distance of the hand, wrist length of wrist of the hand, and wrist width of wrist of the hand.

In yet another implementation, the complex control object is a hand and the method further includes using the selected archetype to determine at least one of whether one or more fingers of the hand are extended or non-extended, one or more angles of bend for one or more fingers, a direction to which one or more fingers point, and a configuration indicating a pinch, a grab, an outside pinch, or a pointing finger.

In some other implementation, the complex control object is an automobile and the initialization parameters include at least one of cabin of the automobile, windshield to rear distance of the automobile, front bumper to rear bumper distance of the automobile, and distance between front of a tire and rear of the tire of the automobile.

In one implementation, a method of initializing predictive information for tracking a complex control object in a three dimensional (3D) sensory space is provided. The method can include receiving predictive information including a model of the control object and receiving observed information including a set of contour points corresponding to points on a surface of the control object. Transforming the set of contour points forms a normalized contour point set. Searching one or more sets of collected observed information using the normalized contour point set enables selecting a set of collected observed information comparable to the normalized contour point set. Initializing the predictive information can be performed based on at least one of pose and position of the set of collected observed information.

Techniques described herein can be applied to initialize "starting" or "estimated" models (e.g., "proto-models) of the predictive information, such as a previous estimate or a starting predictive information indicating a default starting pose.

Observed information includes a set of contour points determined from an image of the control object. The set of contour points can be determined by analyzing image(s) captured from an actual control object or from previously captured images.

A set of contour points can be transformed to form a normalized contour point set applying a vector to the set of contour points, applying a rotation matrix to the set of contour points, applying other techniques, or combinations thereof.

Collected observed information can be stored in any of a variety of data structures, preferably linked (e.g., linked lists, trees, etc.), or database(s) or combinations thereof. Some implementations will store the information in the cloud. Searching can be performed by traversing a linked data structure, visiting a node in the data structure to work with sets of collected observation information associated therewith. The normalized contour point set can be compared to one or more sets of collected observed information associated with the node and a set of collected observed information selected from the sets of collected observed information of the node having a best correspondence with the normalized contour point set. One or more model portions can be aligned based upon configurations of the objects reflected by the sets of collected observed information associated with the node.

In one implementation, the initializing predictive information includes determining from the selected set of collected observed information a velocity of a portion of a hand, a state, and/or a pose to be applied to the predictive information. Velocity can be a velocity of one or more fingers, and/or a relative motion of a portion of the hand. State can be a position, an orientation, and/or a location of a portion of the hand. Pose can be whether one or more fingers are extended or non-extended, one or more angles of bend for one or more fingers, a direction to which one or more fingers point, a configuration indicating a pinch, a grab, an outside pinch, and/or a pointing finger. In one implementation, the initializing predictive information includes determining from the selected set of collected observed information whether a tool or object is present in the hand.

In one implementation, initializing the predictive information includes at least one of applying a rigid alignment technique (e.g., a Kabsch alignment, an iterative closest point alignment) and applying a non-rigid alignment technique (e.g. applying sampling to align).

In one implementation, data structures (or other stores) of like objects in various configurations and poses can be built by capturing images of example objects in various poses, identifying contours in the images, and saving contours of like poses in nodes of a tree as the collected observable information to be searched.

Advantageously, some implementations can enable automatic/programmatic initialization of predictive information including a model of a body portion of a user based upon observed information from images of the body portion. Some implementations further provide quicker, crisper gesture based or "free space" (i.e., not requiring physical contact) interfacing with a variety of machines (e.g., computing systems, including desktop, laptop, tablet computing devices, special purpose computing machinery, including graphics processors, embedded microcontrollers, gaming consoles, audio mixers, or the like, wearable/portable/mobile computing platforms, including smart telephones, portable computing systems, personal data assistants, special purpose visualization computing machinery, including heads up displays (HUD) for use in aircraft or automobiles for example, wearable virtual and/or augmented reality systems, including Google Glass, and others, wired or wirelessly coupled networks of one or more of the foregoing, and/or combinations thereof), obviating or reducing the need for contact-based input devices such as a mouse, joystick, touch pad, or touch screen. Some implementations can provide for improved interface with computing and/or other machinery than would be possible with heretofore known techniques. In some implementations, a richer human-machine interface experience can be provided.

Other aspects and advantages of the present technology can be seen by reviewing the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

As used herein, a given signal, event or value is "based on" a predecessor signal, event or value of the predecessor signal, event or value influenced by the given signal, event or value. If there is an intervening processing element, step or time period, the given signal, event or value can still be "based on" the predecessor signal, event or value. If the intervening processing element or step combines more than one signal, event or value, the signal output of the processing element or step is considered "based on" each of the signal, event or value inputs. If the given signal, event or value is the same as the predecessor signal, event or value, this is merely a degenerate case in which the given signal, event or value is still considered to be "based on" the predecessor signal, event or value. "Responsiveness" or "dependency" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Gesture-Recognition System

Figure 1A:
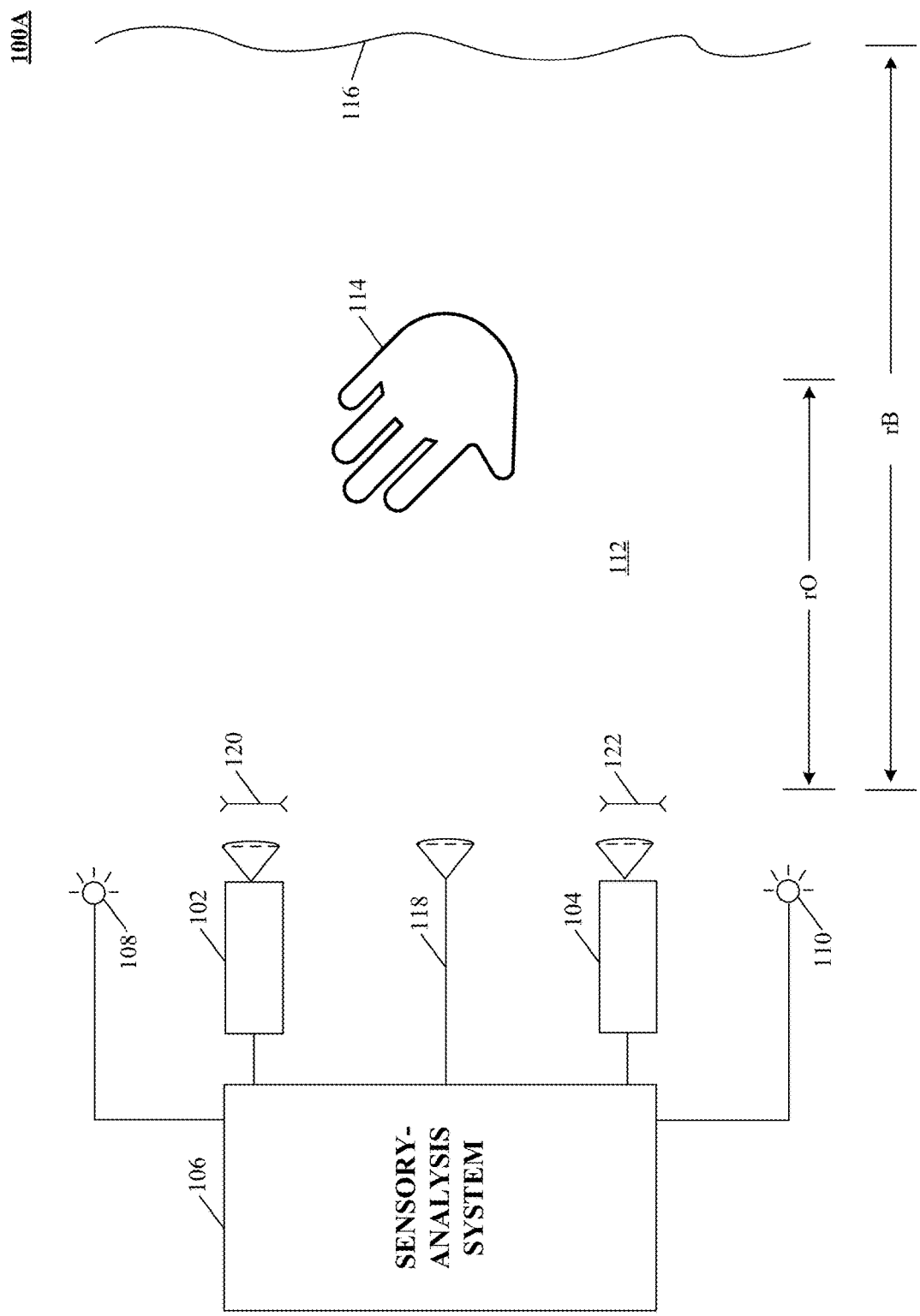
FIG. 1A illustrates a system for capturing image data according to an implementation of the technology disclosed.

Referring first to FIG. 1A, which illustrates an exemplary gesture-recognition system 100A including any number of cameras 102, 104 coupled to a sensory-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors (e.g. 118) or combinations thereof. For example, line sensors or line cameras rather than conventional devices that capture a two dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of a hand of an otherwise stationary person, the volume of interest can be defined as a cube approximately one meter on a side.

In some implementations, the illustrated gesture-recognition system 100A includes one or more sources 108, 110, which can be disposed to either side of cameras 102, 104, and are controlled by sensory-analysis system 106. In one implementation, the sources 108, 110 are light sources. For example, the light sources can be infrared light sources, e.g., infrared light-emitting diodes (LEDs), and cameras 102, 104 can be sensitive to infrared light. Use of infrared light can allow the gesture-recognition system 100A to operate under a broad range of lighting conditions and can avoid various inconveniences or distractions that may be associated with directing visible light into the region where the person is moving. However, a particular wavelength or region of the electromagnetic spectrum can be required. In one implementation, filters 120, 122 are placed in front of cameras 102, 104 to filter out visible light so that only infrared light is registered in the images captured by cameras 102, 104. In another implementation, the sources 108, 110 are sonic sources providing sonic energy appropriate to one or more sonic sensors (not shown in FIG. 1A for clarity sake) used in conjunction with, or instead of, cameras 102, 104. The sonic sources transmit sound waves to the user; the user either blocks (or "sonic shadowing") or alters the sound waves (or "sonic deflections") that impinge upon her. Such sonic shadows and/or deflections can also be used to detect the user's gestures and/or provide presence information and/or distance information using ranging techniques known in the art. In some implementations, the sound waves are, for example, ultrasound, that are not audible to humans.

It should be stressed that the arrangement shown in FIG. 1A is representative and not limiting. For example, lasers or other light sources can be used instead of LEDs. In implementations that include laser(s), additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 that includes a control object such as hand 114 that can optionally hold a tool or other object of interest and cameras 102, 104 are oriented toward the region of interest 112 to capture video images of the hand 114 with background 116. In some implementations, the operation of light sources 108, 110 and cameras 102, 104 is controlled by the sensory-analysis system 106, which can be, e.g., a computer system, control logic implemented in hardware and/or software or combinations thereof. Based on the captured images, sensory-analysis system 106 determines the position and/or motion of an object of interest such as hand 114.

Figure 1B:
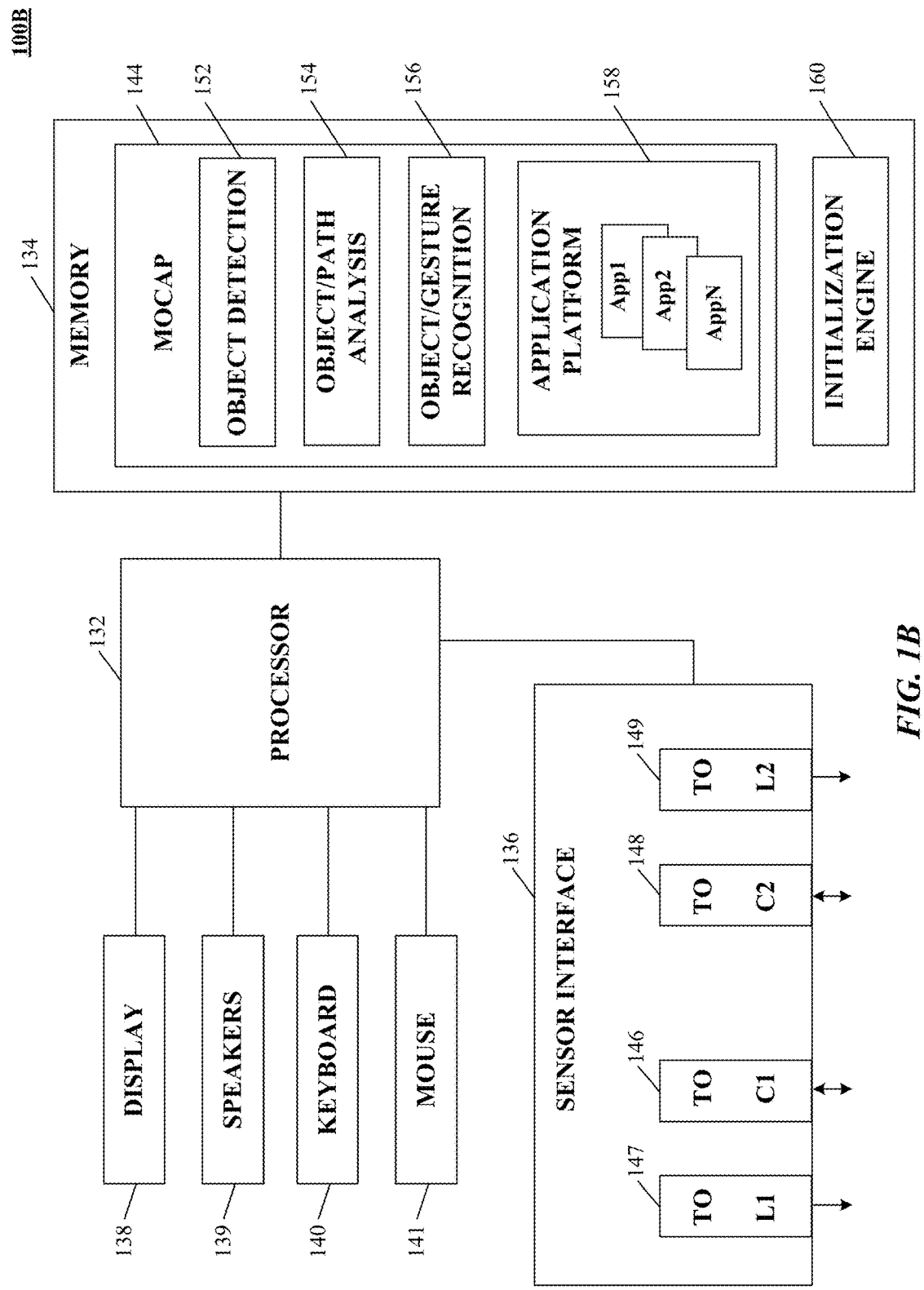
FIG. 1B is a simplified block diagram of a gesture-recognition system implementing an image analysis apparatus according to an implementation of the technology disclosed.

FIG. 1B is a simplified block diagram of a computer system 100B, implementing sensory-analysis system 106 (also referred to as an image analyzer) according to an implementation of the technology disclosed. Sensory-analysis system 106 can include or consist of any device or device component that is capable of capturing and processing image data. In some implementations, computer system 100B includes a processor 132, memory 134, a sensor interface 136, a display 138 (or other presentation mechanism(s), e.g. holographic projection systems, wearable goggles or other head mounted devices (HMDs), heads up displays (HUDs), other visual presentation mechanisms or combinations thereof, speakers 139, a keyboard 140, and a mouse 141. Memory 134 can be used to store instructions to be executed by processor 132 as well as input and/or output data associated with execution of the instructions. In particular, memory 134 contains instructions, conceptually illustrated as a group of modules described in greater detail below that control the operation of processor 132 and its interaction with other hardware components. An operating system directs the execution of low-level, basic system functions such as memory allocation, file management, and operation of mass storage devices. The operating system can include a variety of operating systems such as the Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, the OPENACTION operating system, iOS, Android or other mobile operating systems, or another operating system platform.

The computing environment 100B can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 132 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Sensor interface 136 can include hardware and/or software that enables communication between computer system 100B and cameras such as cameras 102, 104 shown in FIG. 1A, as well as associated light sources such as light sources 108, 110 of FIG. 1A. Thus, for example, sensor interface 136 can include one or more data ports 146, 148 to which cameras can be connected, as well as hardware and/or software signal processors that modify data signals received from the cameras (e.g., to reduce noise or reformat data) prior to providing the signals as inputs to a motion-capture ("mocap") program 144 executing on processor 132. In some implementations, sensor interface 136 can also transmit signals to the cameras, e.g., to activate or deactivate the cameras, to control camera settings (frame rate, image quality, sensitivity, etc.), or the like. Such signals can be transmitted, e.g., in response to control signals from processor 132, which can in turn be generated in response to user input or other detected events.

Sensor interface 136 can also include controllers 147, 149, to which light sources (e.g., light sources 108, 110) can be connected. In some implementations, controllers 147, 149 provide operating current to the light sources, e.g., in response to instructions from processor 132 executing mocap program 144. In other implementations, the light sources can draw operating current from an external power supply, and controllers 147, 149 can generate control signals for the light sources, e.g., instructing the light sources to be turned on or off or changing the brightness. In some implementations, a single controller can be used to control multiple light sources.

Instructions defining mocap program 144 are stored in memory 134, and these instructions, when executed, perform motion-capture analysis on images supplied from cameras connected to sensor interface 136. In one implementation, mocap program 144 includes various modules, such as an object detection module 152, an object/path analysis module 154, and an object/gesture-recognition module 156. Object detection module 152 can analyze images (e.g., images captured via sensor interface 136) to detect edges of an object therein and/or other information about the object's location. Object/path analysis module 154 can analyze the object information provided by object detection module 152 to determine a 3D position and/or motion of the object (e.g., a user's hand 114). Examples of operations that can be implemented in code modules of mocap program 144 are described below. Memory 134 can also include other information and/or code modules used by mocap program 144 such as an application platform 158 that allows a user to interact with the mocap program 144 using different applications like application 1 (App1), application 2 (App2), and application N (AppN).

Display 138, speakers 139, keyboard 140, and mouse 141 can be used to facilitate user interaction with computer system 100B. In some implementations, results of gesture capture using sensor interface 136 and mocap program 144 can be interpreted as user input. For example, a user can perform hand gestures that are analyzed using mocap program 144, and the results of this analysis can be interpreted as an instruction to some other program executing on processor 132 (e.g., a web browser, word processor, or other application). Thus, by way of illustration, a user might use upward or downward swiping gestures to "scroll" a webpage currently displayed on display 138, or use rotating gestures to increase or decrease the volume of audio output from speakers 139, and so on.

It will be appreciated that computer system 100B is illustrative and that variations and modifications are possible. Computer systems can be implemented in a variety of form factors, including server systems, desktop systems, laptop systems, tablets, smart phones or personal digital assistants, wearable devices, e.g., goggles, head mounted devices (HMDs), wrist computers, and so on. A particular implementation can include other functionality not described herein, e.g., wired and/or wireless network interfaces, media playing, and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 100B is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

Again referring to FIGS. 1A and 1B, the user performs a gesture that is captured by cameras 102, 104 as a series of temporally sequential images. In other implementations, cameras 102, 104 can capture any observable pose or portion of a user. For instance, if a user walks into the field of view near the cameras 102, 104, cameras 102, 104 can capture not only the whole body of the user, but the positions of arms and legs relative to the person's core or trunk. These are analyzed by the object/gesture-recognition module 156, which can be implemented as another module of the mocap 144. In an exemplary implementation, object/gesture-recognition module 156 provides input to an electronic device, allowing a user to remotely control the electronic device, and/or manipulate virtual objects, such as prototypes/models, blocks, spheres, or other shapes, buttons, levers, or other controls, in a virtual environment displayed on display 138. The user can perform the gesture using any part of her body, such as a finger, a hand, or an arm. As part of gesture recognition or independently, the sensory-analysis system 106 can determine the shapes and positions of user's hand in 3D space and in real time; see, e.g., U.S. Ser. Nos. 61/587,554, Ser. No. 13/414,485, 61/724,091, and Ser. No. 13/724,357 filed on Jan. 17, 2012, Mar. 7, 2012, Nov. 8, 2012, and Dec. 21, 2012 respectively, the entire disclosures of which are hereby incorporated by reference. As a result, the sensory-analysis system 106 can not only recognize gestures for purposes of providing input to the electronic device, but can also capture the position and shape of user's hand in consecutive video images in order to characterize the hand gesture in 3D space and reproduce it on display 138.

In one implementation, the object/gesture-recognition module 156 compares the detected gesture to a library of gestures electronically stored as records in a database, which is implemented in the sensory-analysis system 106, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently.

Capsule Hand

Figure 2A:
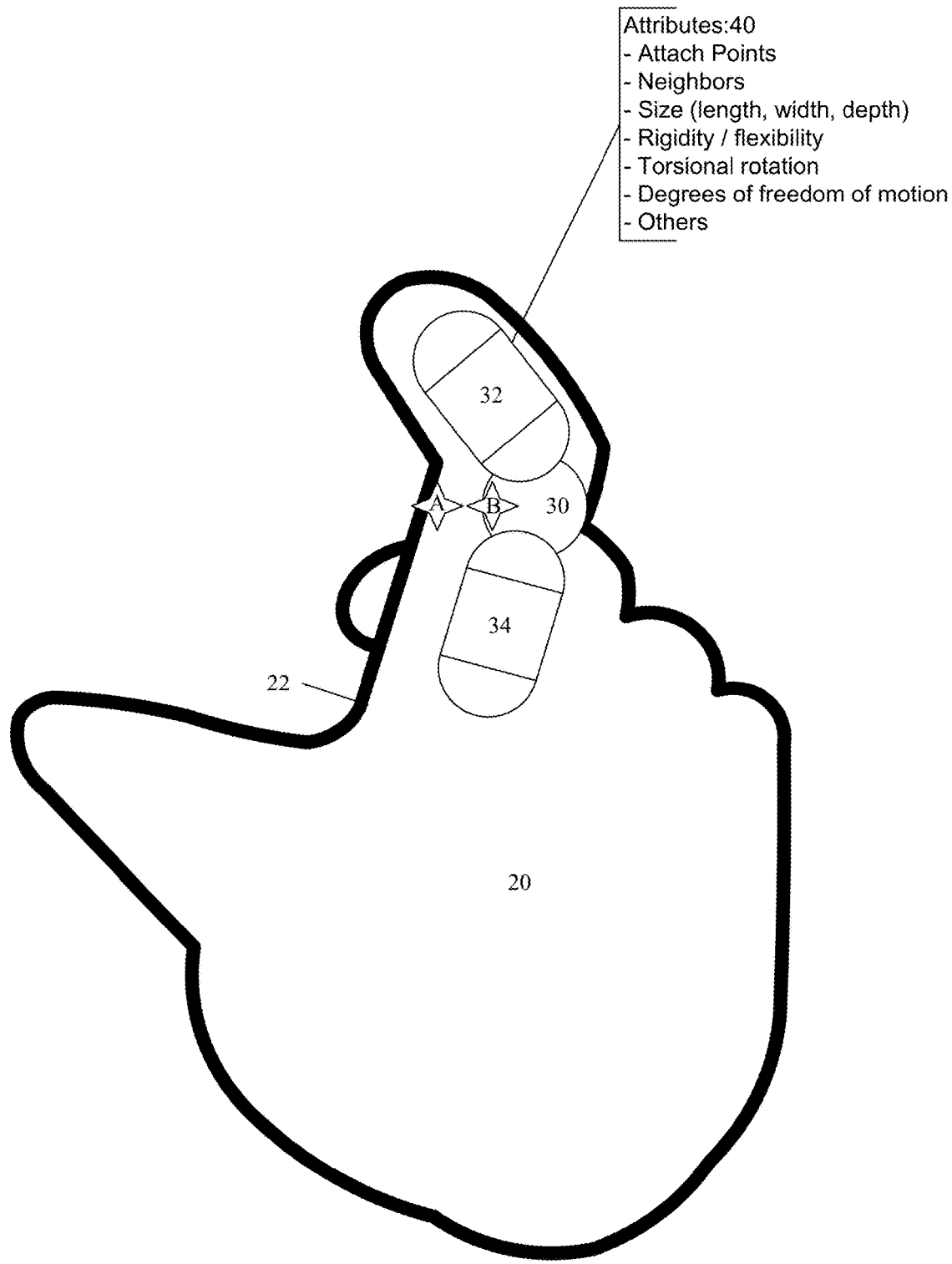
FIGS. 2A, 2B, 2C, and 2D illustrate one implementation of capsule representation of predictive information in accordance with implementations of the technology disclosed.

FIGS. 2A, 2B, 2C, and 2D illustrate one implementation of capsule representation of predictive information. FIG. 2A is a simplified illustration of prediction information for an object according to an implementation. As illustrated by FIG. 2A, prediction information 20 of a control object 114 of FIG. 1A (also interchangeably referred to as an "object of interest") can be constructed from one or more model subcomponents 30, 32, 34 selected and/or configured to represent at least a portion of a surface of control object 114, one or more attributes 40, and virtual surface portion 22. Other components can be included in prediction information 20, not shown in FIG. 2A for clarity sake. In an implementation, the model subcomponents can be selected from a set of radial solids, which can reflect at least a portion of the control object 114 in terms of one or more of structure, motion characteristics, conformational characteristics, other types of characteristics of control object 114, and/or combinations thereof. In one implementation, radial solids are objects made up of a 2D primitive (e.g., line, curve, plane) and a surface having a constant radial distance to the 2D primitive. A closest point to the radial solid can be computed relatively quickly. As used herein, three or greater capsules are referred to as a "capsoodle".

One radial solid implementation includes a contour and a surface defined by a set of points having a fixed distance from the closest corresponding point on the contour. Another radial solid implementation includes a set of points normal to points on a contour and a fixed distance therefrom. In an implementation, computational technique(s) for defining the radial solid include finding a closest point on the contour and the arbitrary point, then projecting outward the length of the radius of the solid. In an implementation, such projection can be a vector normal to the contour at the closest point. An example radial solid (e.g., 32, 34) includes a "capsuloid", i.e., a capsule shaped solid including a cylindrical body and semi-spherical ends. Another type of radial solid (e.g., 30) includes a sphere. Other types of radial solids can be identified based on the foregoing teachings.

One or more attributes 40 can define characteristics of a model subcomponent 32. Attributes can include e.g., sizes, rigidity, flexibility, torsion, zero or more degrees of freedom of motion with respect to one or more defined points, which can include endpoints for example. In an implementation, predictive information about the control object can be formed to include a model of the control object 114 together with attributes defining the model and values of those attributes.

In an implementation, when control object 114 morphs, conforms, and/or translates, motion information reflecting such motion(s) is included into the observed information. Points in space can be recomputed based on the new observation information. Responsively, the model subcomponents can be scaled, sized, selected, rotated, translated, moved, or otherwise re-ordered to enable portions of the model corresponding to the virtual surface(s) to conform within the set of points in space.

Figure 2B:
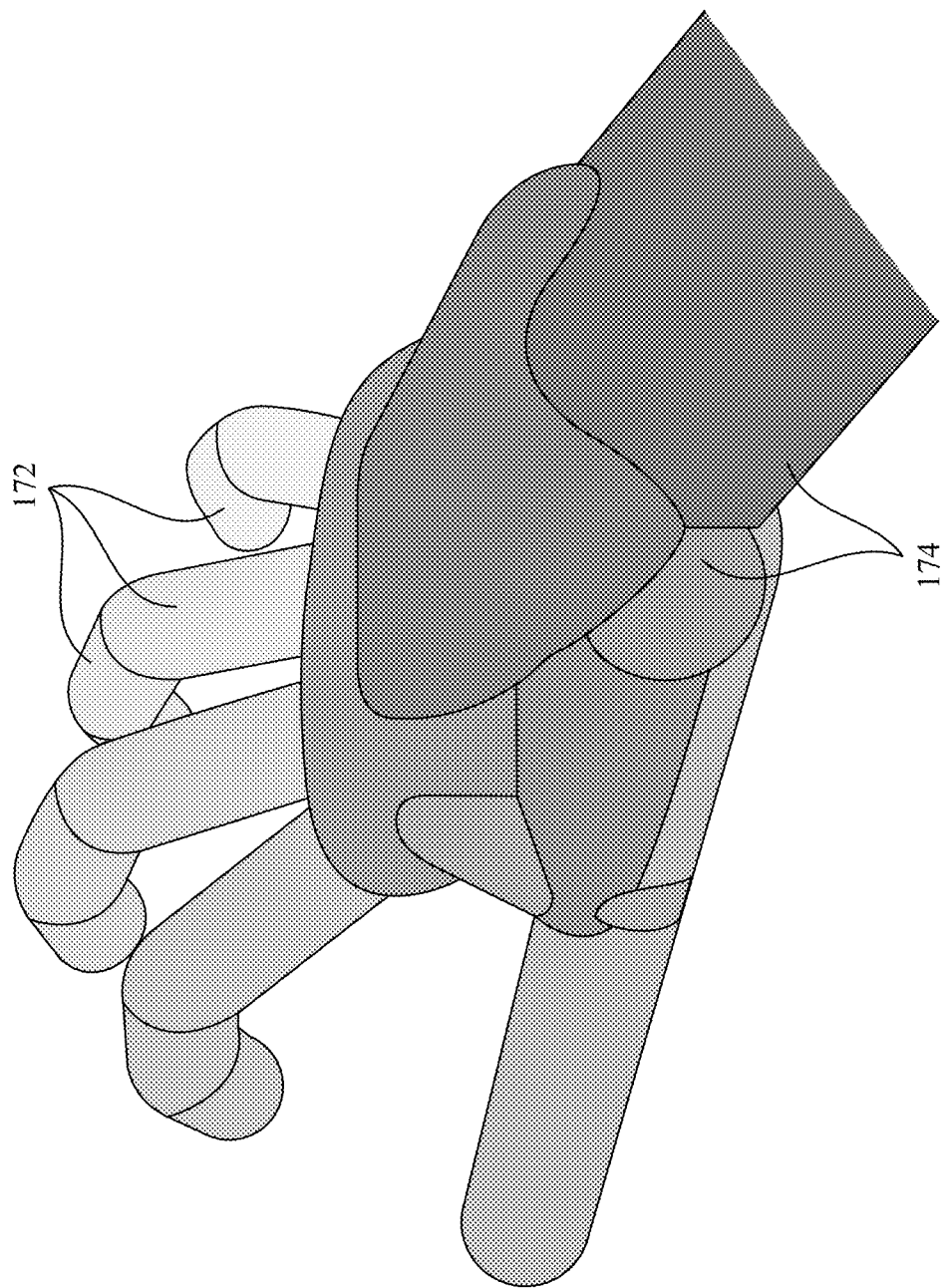
Figure 2C:
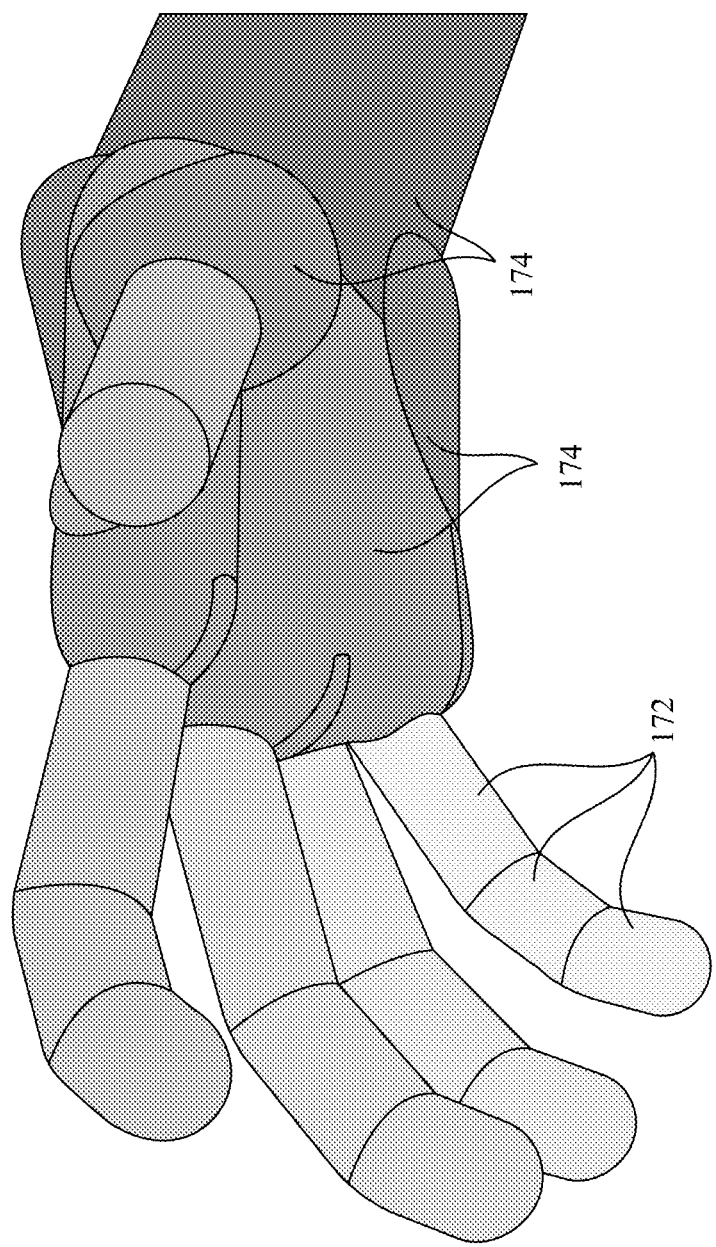
Figure 2D:
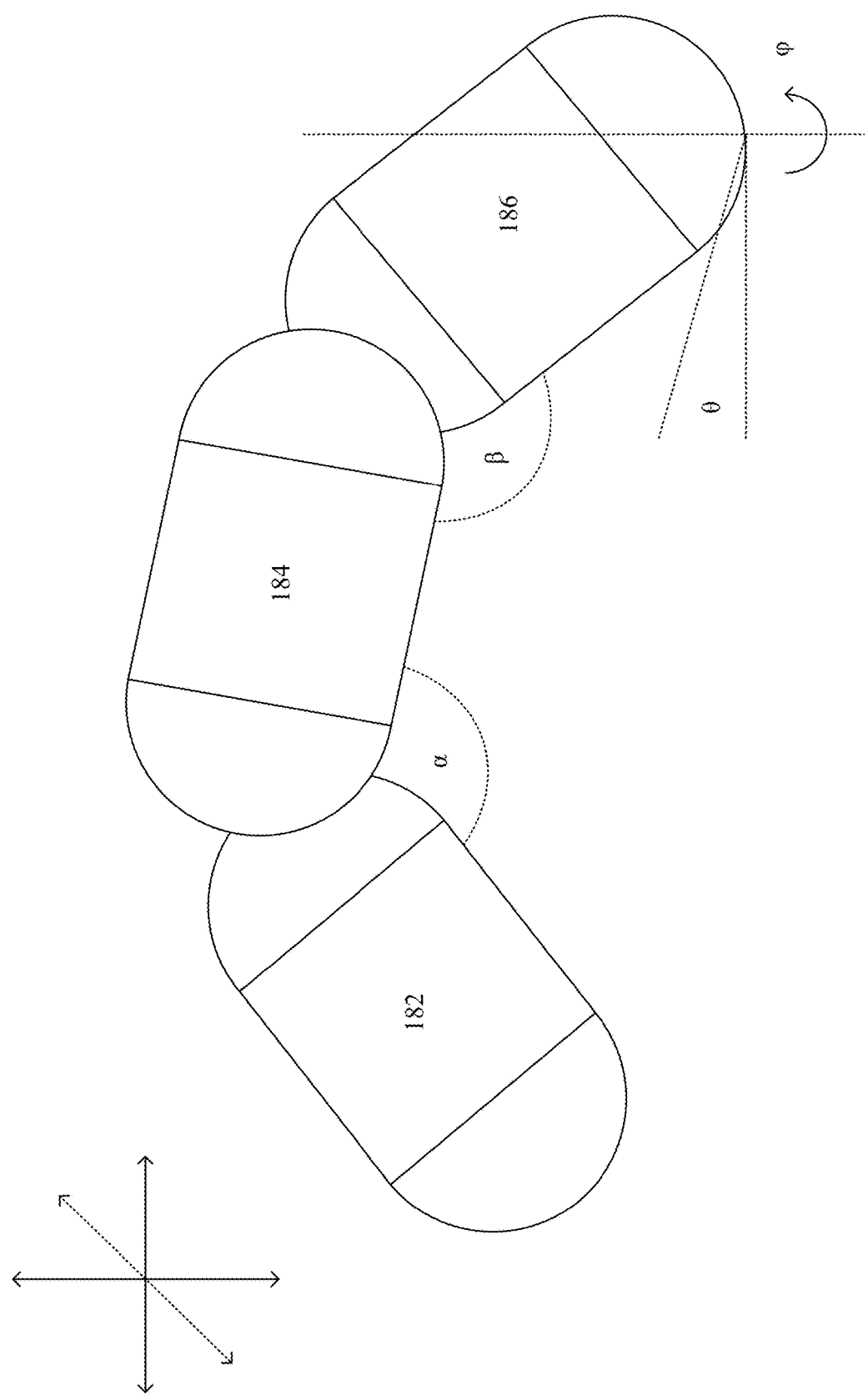

In an implementation and with reference to FIGS. 2B and 2C, a collection of radial solids and/or capsuloids can be considered a "capsule hand". A number of capsuloids 172, e.g. five capsuloids, are used to represent fingers on a hand while a number of radial solids 174 are used to represent the shapes of the palm and wrist. With reference to FIG. 2D, a finger capsuloid with radial solids 182, 184, 186 can be represented by its two joint angles ($\alpha$, $\beta$), pitch ($\theta$), and yaw ($\varphi$). In an implementation, the angle $\beta$ can be represented as a function of joint angle $\alpha$, pitch $\theta$, and yaw $\varphi$. Allowing angle $\beta$ to be represented this way can allow for faster representation of the finger capsuloid with fewer variables; see, e.g., U.S. Ser. Nos. 61/871,790, filed 29 Aug. 2013 and 61/873,758, filed 4 Sep. 2013. For example, one capsule hand can include five capsules for each finger, a radial polygon defining a base of a hand and a plurality of definitional capsules that define fleshy portions of the hand.

In one implementation, analyzing includes stereo matching, depth maps, finding contours and/or feature points reduced to certain finite number of degrees of freedom. Such an analysis enables simplification of problems of IK, sampling sizes, pose determination, etc.

Initialization

FIGS. 3A, 3B, 3C, 3D, 3E, 3F, 3G, 3H, and 3I illustrate one implementation of initializing capsule representation of predictive information. Initialization can include determining and applying one or more initialization parameters to the model to scale and orient the model.

Scaling

Figure 3A:
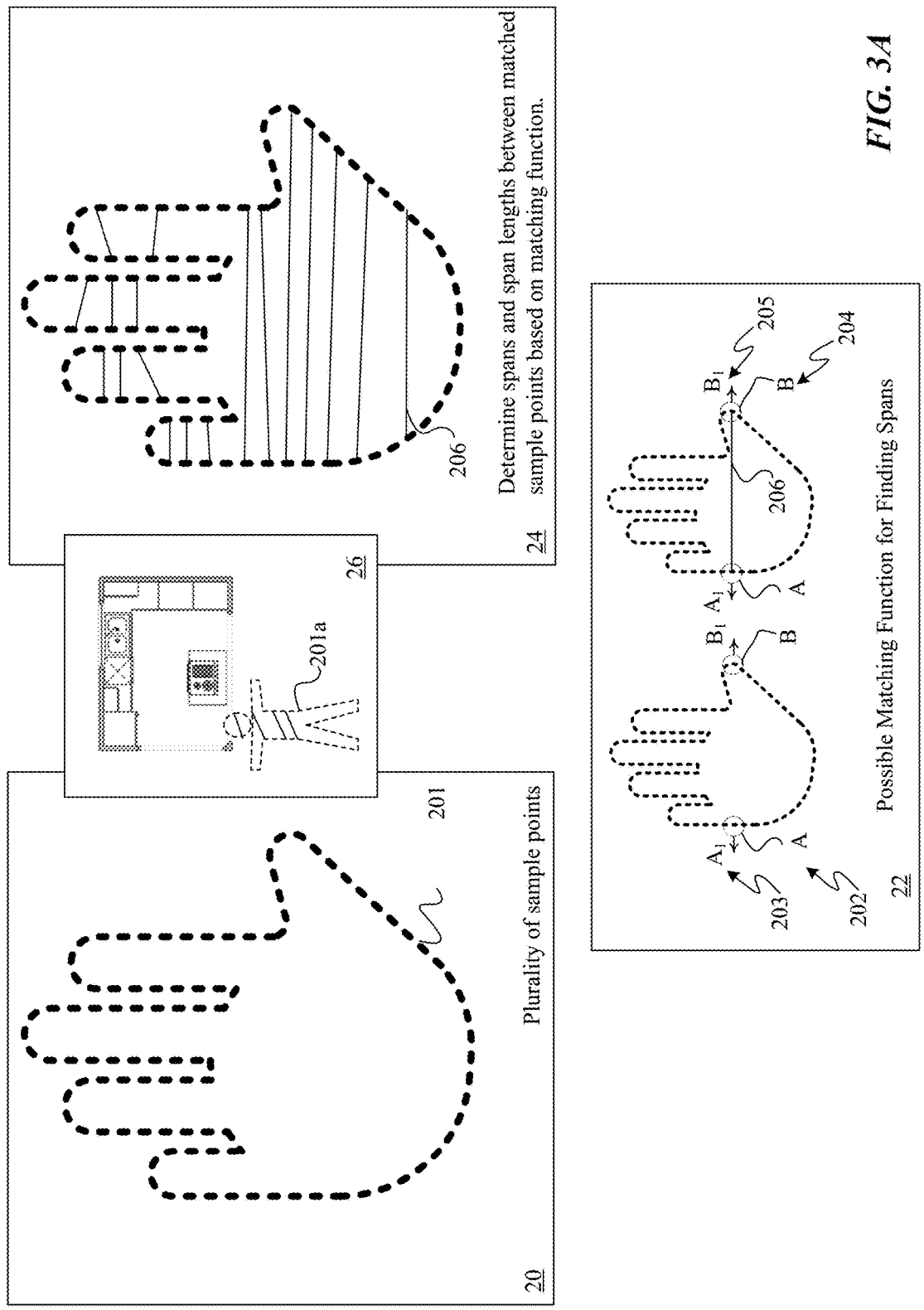
FIGS. 3A, 3B, 3C, 3D, 3E, 3F, 3G, 3H, and 3I illustrate one implementation of initializing capsule representation of predictive information in accordance with implementations of the technology disclosed.
Figure 3B:
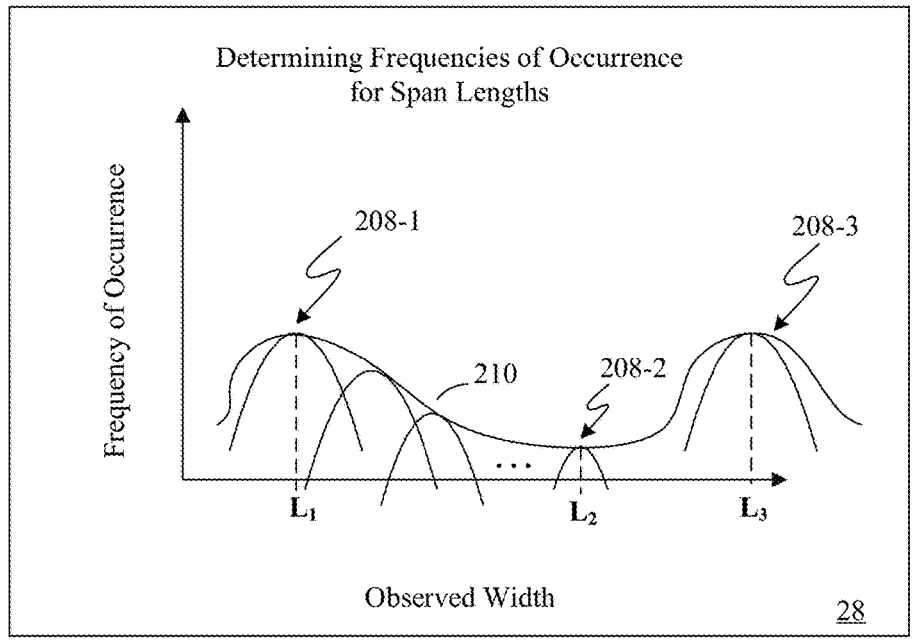
Figure 3B:
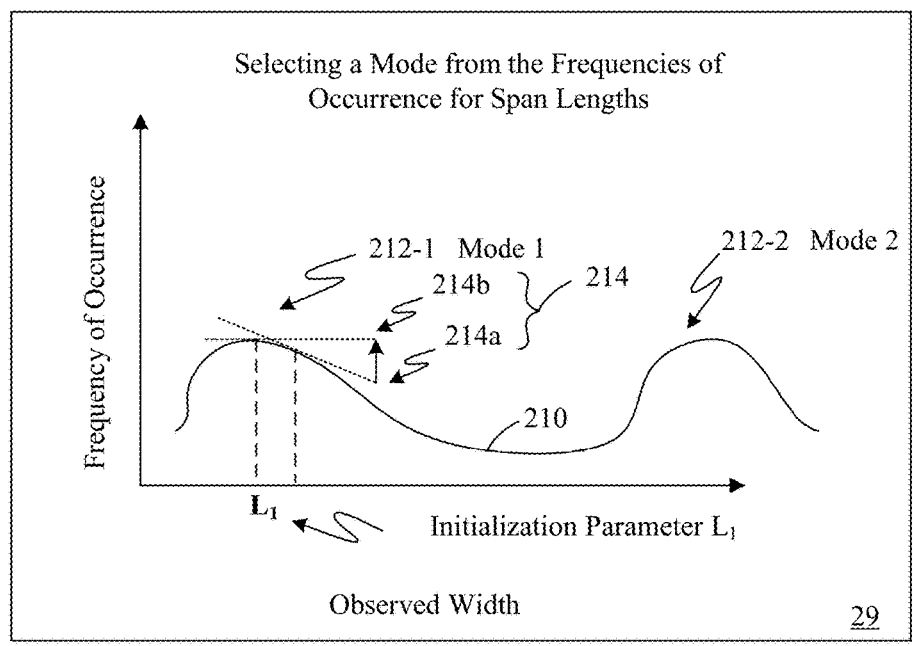
Figure 3C:
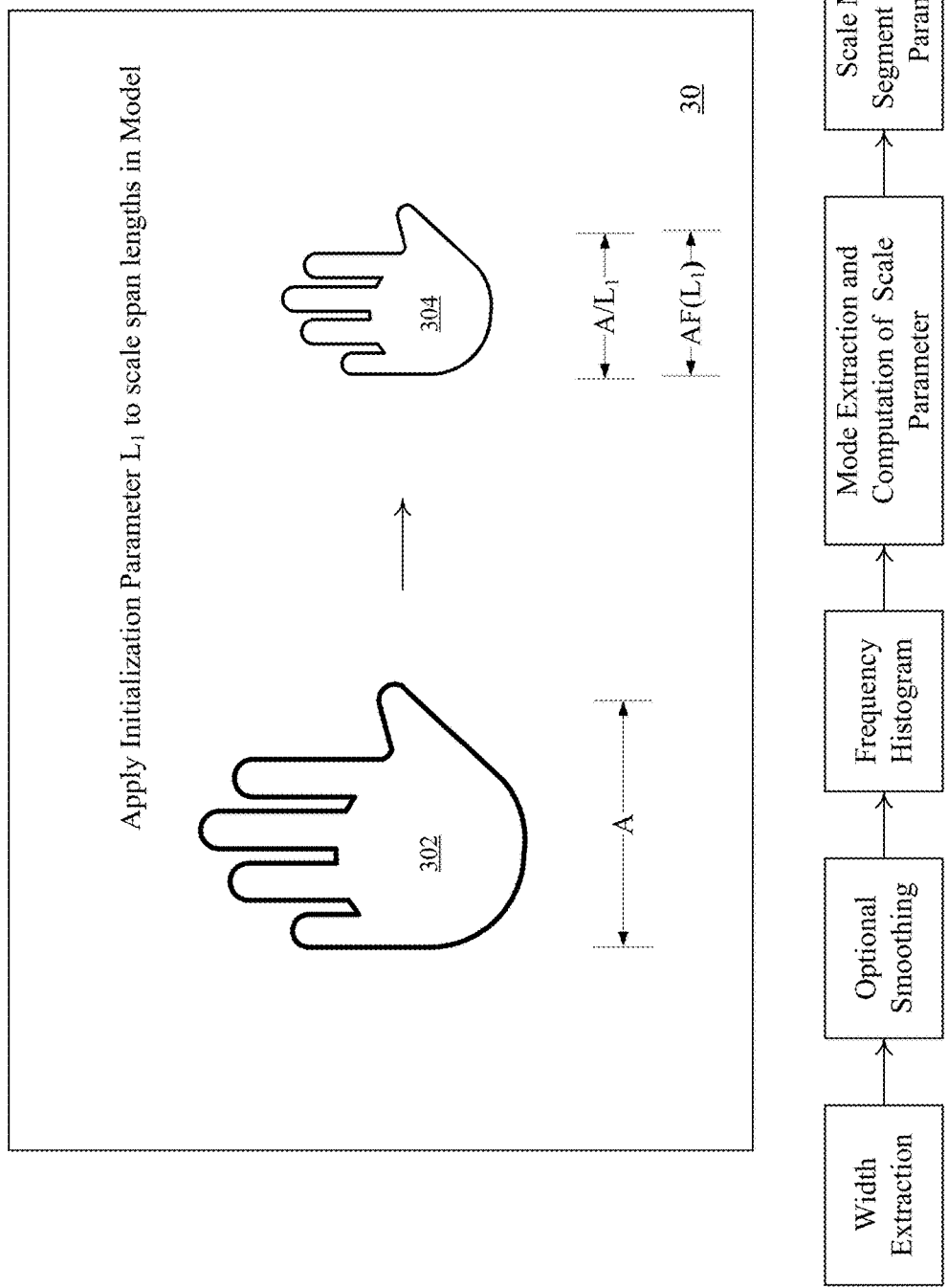

In one implementation, initialization includes scaling a model by an appropriate initialization parameter. FIG. 3A depicts determining spans and span lengths in the observed information in which one or more point pairings are selected from a surface portion as represented in the observed information. As illustrated by block 20 of FIG. 3A, an observed surface portion 201 (i.e., of observed information) can comprise a plurality of sample points from which one or more point pairings can be selected. In a block 22 of FIG. 3A, a point pairing between point A and point B of observed surface portion 201 is selected by application of a matching function, such as for example the matching function. One method for determining a point pairing using a matching function is also illustrated by FIG. 3A, in which a first unmatched (arbitrary) point A on a contour (of block 22 of FIG. 3A) representing a surface portion of interest in the observed information is selected as a starting point 202. A normal $A_1$ 203 (of block 22 of FIG. 3A) is determined for point A. A wide variety of techniques for determining a normal can be used in implementations, but in one example implementation, a set of points proximate to the first unmatched point, at least two of which are not co-linear, is determined. Then, a normal for the first unmatched point can be determined using the other points in the set by determining a normal perpendicular to the plane. For example, given points $P_1$, $P_2$, $P_3$, the normal n can be given by the cross product:

$$n=(p_2-p_1)\times(p_3-p_1)$$

Another technique can be to: (i) start with the set of points; (ii) form a first vector from $P_2-P_1$; and (iii) apply rotation matrix to rotate the first vector 90 degrees away from the center of mass of the set of points. (The center of mass of the set of points can be determined by an average of the points). A yet further technique can be to: (i) determine a first vector tangent to a point on a contour in a first image; (ii) determine from the point on the contour a second vector from that point to a virtual camera object in space; and (iii) determine a cross product of the first vector and the second vector. The cross product is a normal vector to the contour.

Again with reference to FIG. 3A, the closest second unmatched point B 204 (of block 22 of FIG. 3A) reachable by a convex curve (line 206) and having the most opposite normal $B_1$ 205 is found. Accordingly, points A and B form a point pairing. As illustrated by block 26 of FIG. 3A, the object need not be a hand (nor for that matter, even a portion of a human being).

Again with reference to FIG. 3A, a span length is determined for at least one of the one or more point pairings selected. Now with reference to block 24 of FIG. 3A, one or more spans and span lengths are determined for the one or more point pairings. In a representative implementation, a span can be found by determining a shortest convex curve for the point pairings A and B. It is determined whether the convex curve passes through any other points of the model. If so, then another convex curve 206 is determined for paired points A and B. Otherwise, the span comprises the shortest continuous segment found through paired points A and B that only intersects the model surface at paired points A and B. In an implementation, the span can comprise a convex geodesic segment that only intersects the model at two points. A span can be determined from any two points using the equation of a line fitted to the paired points A and B for example.

Again with reference to FIG. 3A, a check is made to determine whether there are any further points to process. If there are further point pairs to process, then the flow continues to process the next pair. Otherwise, frequencies of occurrence are determined for the various span lengths. One way that is used to determine frequency of occurrence is illustrated by block 28 of FIG. 3B. Block 28 shows fitting of one or more radial basis functions 208-1, 208-2, and 208-3 to the observed span lengths L1, L2 and L3. For example, a radial basis function (Gaussian or approximation thereof) can be selected for one or more observed span length values using techniques described below. A function appropriate to the implementation is applied to the radial basis functions to provide a frequency of occurrence for the span lengths. For example, in block 28 of FIG. 3B, the radial basis functions 208-1, 208-2, and 208-3 are summed to arrive at a frequency of occurrence wave 210 for the observed span lengths. (A "wave" denoting a continuous function.) Of course, in implementations, other functions (multiplication, averaging, interpolation, and so forth, and/or combinations thereof depending upon the implementation specific requirements or desirability) can be applied to the radial basis functions to arrive at a frequency of occurrence. Now, the result of applying the function to the one or more radial basis functions is provided. In an implementation, smoothing techniques (interpolation, Gaussian, bucketing, rounding, others, combinations thereof) can be applied to a discrete relationship comprising discrete point pairings to form a continuous curve.

Parameters for the radial basis functions, i.e., width of the function for example, can be selected using a variety of techniques. One technique for determining a width of a radial basis function includes selecting a radial basis function for one or more observed span length values, having one or more properties, which can be determined. For example, a variance of the dataset including the observed span lengths is determined. The variance is divided by an expectation value. Expectation values can be determined from an expected number of modes in the dataset determined from the span lengths in the observed information. For example, using horizontally disposed spans, as illustrated by FIG. 3A, observed span lengths of a hand and arm can be sorted into approximately four expected expectation values: one value corresponding to an approximate cross finger diameter length; one value corresponding to a cross the palm length; one value corresponding to a span across the palm to the thumb; and one value corresponding to a span cross the wrist length. A face can be sorted into one value. An automobile (observed from its side) can be sorted into three values: one for the cabin, windshield to rear window; one from the front bumper to the rear bumper; and one from the front of the tire to the rear of the tire. The variance divided by the expectation value is provided as a width of the radial basis function.

Other techniques for determining frequencies of occurrence for the various span lengths that can be used in implementations include bucketing—in which buckets of fixed or variable width are assigned to one or more discrete points representing span length occurrences within some range corresponding to the bucket width. The frequency of occurrences for each bucket can be combined (e.g., interpolation, summed, weighted, smoothed or other combinations, and/or combinations thereof) to produce a frequency of occurrence function.

A span length can be selected as the initialization parameter based upon the frequency of occurrences of observed span lengths. Using one or a different technique described above, an initialization parameter can be determined using a technique for performing mode selection on the frequencies of occurrence for the bucketed span lengths. One technique is mode selection, illustrated with reference to FIG. 3B, that includes determining one or more modes from the frequencies of occurrence of observed span lengths. For example, in one technique illustrated with reference to block 29 of FIG. 3B, mode 1 (212-1) and mode 2 (212-2) are defined by locations on the frequency occurrence wave 210 in which there exists a local minima or maxima. Accordingly, one technique for determining modes from the frequencies of occurrence comprises finding minima or maxima of the frequency of occurrence wave 210. A mode of interest, e.g., a mode having a most frequently occurring span length, can be selected.

One technique for determining minima or maxima indicating modes comprises employing a gradient descent technique. With reference to block 29 of FIG. 3B, a gradient can be determined (i.e., by taking a derivative 214 of a function representing a frequency of occurrence (for example frequency occurrence wave 210 determined above)). One or more minima 214b of the derivative 214 of the function can be determined to indicate a mode of interest. For example, one technique applies Rolle's Theorem to determine a minima (or maxima) at a point in the frequency occurrence wave 210 along some closed interval demarcated by two points on the curve having the same function value. An initialization parameter is determined from the mode of interest. For example, again with reference to block 29 of FIG. 3B, a span length $L_1$ corresponding to mode 1 (212-1) is selected as the initialization parameter.

In a yet further technique, properties of the frequency of occurrence other than mode can be used to determine an initialization parameter. For example, expected value of frequency of occurrence, appearance of the number of modes, spacing between modes, other properties, and/or combinations thereof can be used to determine initialization parameters. Accordingly, a most frequently occurring span length can be used as an initialization parameter. In an alternative implementation, a least frequently occurring span length ($L_2$ in block 28 of FIG. 3B) can be returned as the initialization parameter.

In some implementations, an initialization parameter is applied to at least a portion of a model within the predictive information. Application of the initialization parameter can be used to initialize the model portion using a variety of techniques—scaling, weighting, specifying (or computing) confidence factors, selecting model portions, and mode selection (child's hand, cat's paw, tool tip, and so forth). For example and with reference to block 30 of FIG. 3C, span length(s) of one or more portion of a model 302 in the predictive information can be scaled using the initialization parameter $L_1$ as a scaling factor to produce an initialized model 304. In implementations, scaling can include multiplying (or dividing) the span length(s) by the scaling factor. In other implementations, the scaling factor can be applied according to a function based on the scaling factor, for example, a function $F(L_1)$ that determines based at least in part upon the initialization parameter that a model portion is too large (or small) and can be used to exclude (or alter the weighting or confidence factor) for that portion in the model. In yet further implementations, the span length(s) can be scaled according to the scaling factor and one or more quantifiable characteristics can be determined from imaging the object (i.e., brightness, frequencies, and so forth). In a further implementation, a model portion is selected based at least in part upon the initialization parameter. For example, an initialization parameter can be used to select from models of adult hands, children's hands, animal paws, tool tips, and so forth. In yet further implementations, initialization parameters can be used to communicate control information to the sensory device, for example, changing power consumption profiles based on size of observed object(s), changing frame rates, selecting user modes in software (tool, hand, face discrimination), background elimination, noise elimination; see, e.g., U.S. Ser. No. 61/911,975, filed Dec. 4, 2013.

Orientation

Figure 3D:
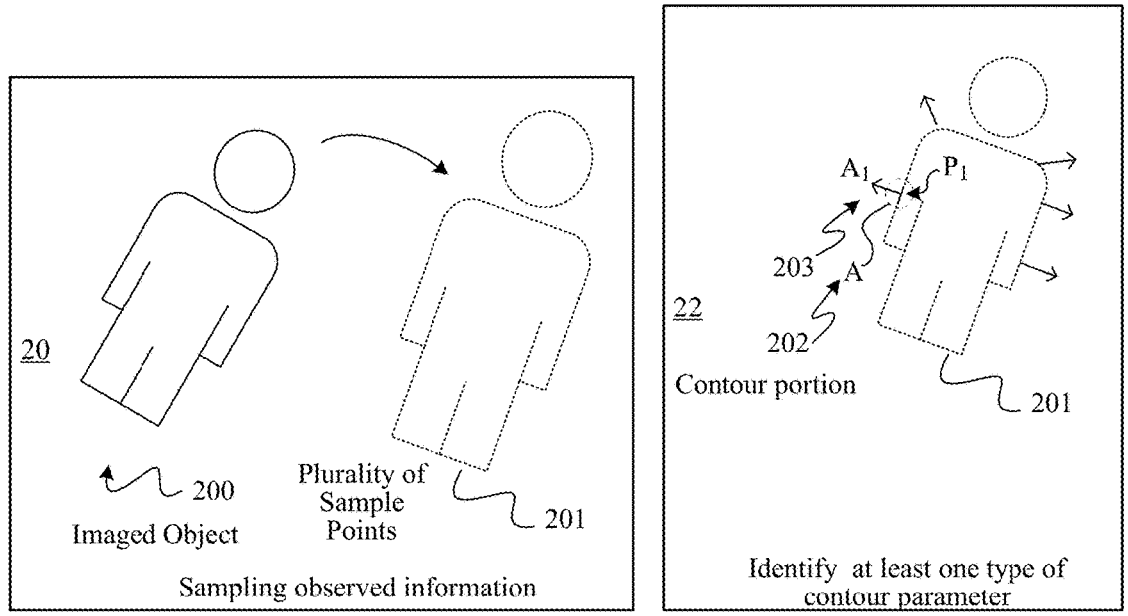
Figure 3E:
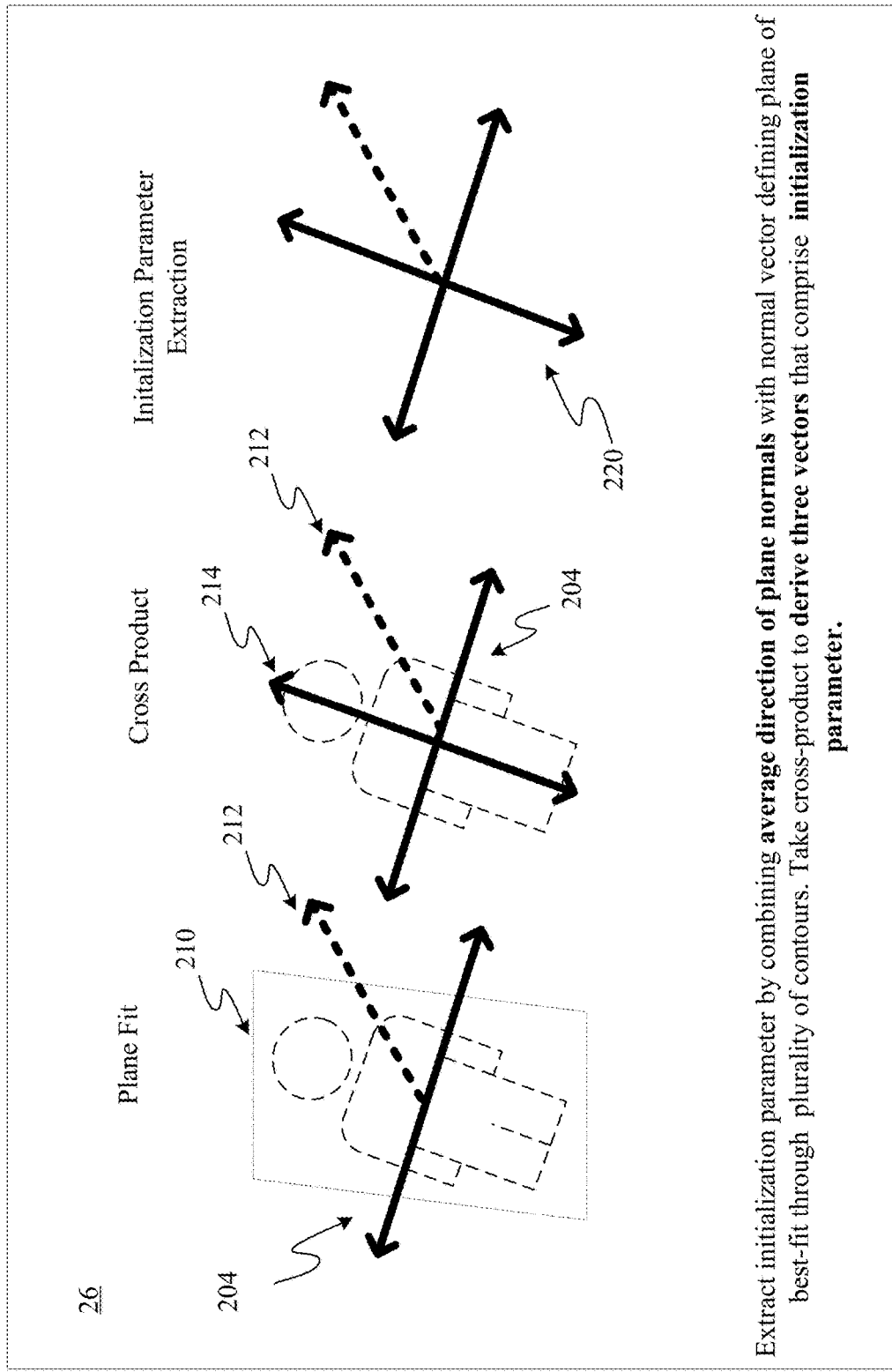
Figure 3F:
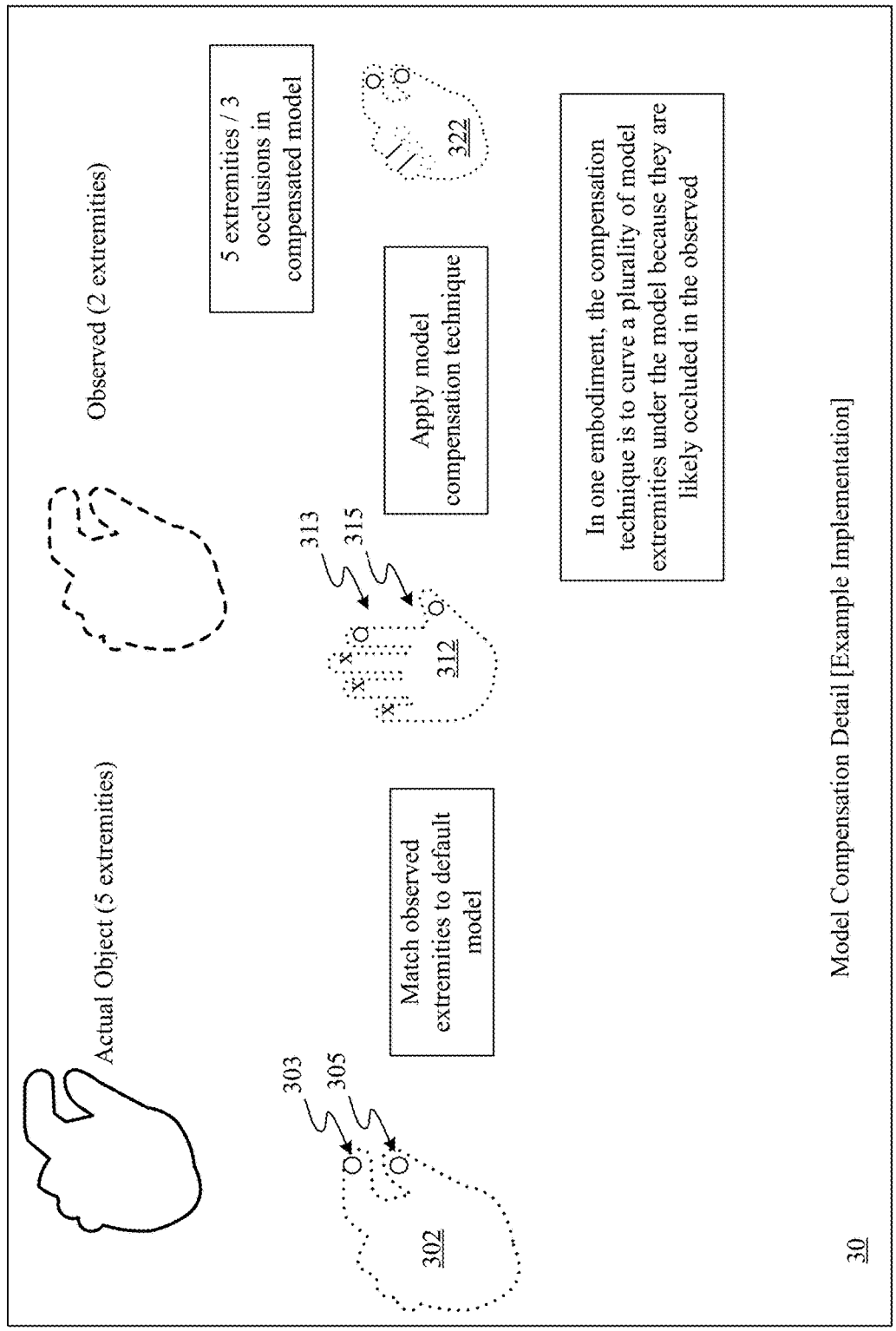

In one implementation, initialization includes orienting a model by an appropriate initialization parameter. Now with reference to FIG. 3D, FIG. 3D illustrates one or more contours that are extracted from a surface portion as represented in the observed information. As illustrated by block 20 of FIG. 3D, a surface portion of an imaged object 200 (e.g., image of real object(s), computer generated input, or combinations thereof) within the observed information can comprise a plurality of surfaces that can be sampled to provide points 201, from which one or more contours 202 can be extracted.

One method of determining a contour portion is illustrated by block 22 of FIG. 3D, in which the observed information can be sampled to determine a set of points. In some implementations, the observed information can comprise an image or images of the imaged object 200 to be sampled. In other implementations, the observed information comprises instead of, a set of points or a set of contours determined from an imaged object 200. From a set of points 201, one or more contours 202 can be determined using any of a variety of techniques, such as for example determining a gradient for points determined from the imaged object. When a relatively larger value of the gradient is determined, points along the relatively larger value of the gradient can comprise a contour. As shown by block 22 of FIG. 3D, a contour portion A 202 can be determined from a plurality of points 201 of block 20.

Now again with reference to FIG. 3D, one or more contour parameters are identified for at least one extracted contour. As shown by block 22 of FIG. 3D, a contour parameter comprising normal A1 203 can be determined from contour portion A 202. A first (arbitrary) point P1 on a contour portion representing a surface portion of interest in the observed information is selected as a starting point. A normal is identified at the point P1. One method of determining a normal is illustrated by block 22 of FIG. 3D, in which a set of points proximate to the first point P1, at least two of which are not co-linear, is determined. Then a normal for the first unmatched point can be determined using the other points in the set by determining a normal perpendicular to the plane. For example, given points P1, P2, P3, the normal n is given by the cross product:

$$n=(p_2-p_1)\times(p_3-p_1)$$

Another technique can be to: (i) start with the set of points; (ii) form a first vector from P2–P1; and (iii) apply rotation matrix to rotate the first vector 90 degrees away from the center of mass of the set of points. (The center of mass of the set of points can be determined by an average of the points). A yet further technique can be to: (i) determine a first vector tangent to a point on a contour in a first image; (ii) determine from the point on the contour a second vector from that point to a virtual camera object in space; and (iii) determine a cross product of the first vector and the second vector. The cross product is a normal vector to the contour.

In implementations, other instances of the contour parameter, i.e., other normal(s), can be determined for other contour portions determined from the sample points 201 corresponding to the imaged object 200. Furthermore, instances of different types of contour parameters, e.g., center(s) of mass, (e.g., a weighted average of the points within a set), a curvature(s), and so forth, can be determined for the contour portions determined from the sample points 201 corresponding to the imaged object 200.

A check is made to determine whether there are any further parameters to process. If there are further parameters to process, then the flow continues to process the next parameter. Otherwise, at least one contour property is determined for the various contour parameters. One way to determine a contour property is illustrated by block 24 of FIG. 3D in which one or more contour parameters 203 are combined to produce a contour property 204 by applying a function. For example, one or more normal(s) 203 can be combined to form an average normal 204. A function appropriate to the implementation is applied to the contour parameters to provide grouping of information from the contour parameters into a contour property. For example, in block 24 of FIG. 3D, the average function can be applied to the set of normal(s) determined in block 22 to create an average normal 204. Of course, in implementations, other functions (mean, mode, variance, interpolation, and so forth and/or combinations thereof depending upon the implementation specific requirements or desirability) can be applied to the contour parameters to arrive at a contour property. The result of applying the function to the one or more contour parameters is provided as the contour property 204.

An initialization parameter is determined based at least in part upon the at least one contour property determined above. An initialization parameter can be determined in a variety of ways, such as using one technique illustrated with reference to block 26 of FIG. 3E, in which a plane 210 (FIG. 3E) of best fit is determined through contours in the observed information. A number of techniques are available for determining a plane of best fit illustrated with reference to block 26 of FIG. 3E, one example being multi-linear regression. A third vector 214 is determined by combining a contour property 204 (e.g., average direction of plane normal vectors) with a normal vector 212 defining the plane 210 to derive a third vector 214. One technique employs a cross product to combine contour property 204 with normal vector 212, however other techniques can be used in some implementations.

An initialization parameter 220 determined from the three vectors is provided to the system to initialize orientation of the model. For example, again with reference to block 26 of FIG. 3E, normal vector 212, contour property 204, and cross product 214 can be provided as the initialization parameter 220. In an implementation, the procedure completes and returns a set of vectors as an initialization parameter. In an alternative implementation, a least one of the vectors (214 in block 26 of FIG. 3E) can be returned as the initialization parameter 220.

Orientation of the model portion is initialized by applying the initialization parameter to at least a portion of a model within the predictive information. Application of the initialization parameter can be used to initialize orientation of the model portion using a variety of techniques—aligning, weighting, specifying (or computing) confidence factors, selecting model portions, and mode selection (child's hand, cat's paw, tool tip, and so forth). For example, one or more portions of a model in the predictive information can be aligned using the initialization parameter 220 as an initial alignment in which a portion(s) of the object is placed to produce an initialized model. In implementations, aligning can include rotational alignment of the model along one or more axes to correspond to the initialization parameter. In other implementations, the rotational alignment can be applied to portion(s) of the model according to a function F, that determines, based at least in part upon the initialization parameter, that a model portion is too far removed from alignment in one or more directions for example to be used. Function F can exclude (or alter the weighting or confidence factor) for that portion in the model based at least in part upon the initialization parameter. In yet further implementations, the model can be aligned according to the initialization parameter and one or more quantifiable characteristics determined from imaging the object (i.e., brightness, frequencies, and so forth). In a further implementation, a model portion can be selected based at least in part upon a degree to which the model portion(s) align to the initialization parameter. For example, an initialization parameter can be used to select from models for adult hands, children's hands, animal paws, tool tips, and so forth based upon alignment. In yet further implementations, initialization parameters can be used to communicate control information to the sensory device, for example, changing power consumption profiles based on quality of alignment of observed object(s), changing frame rates, selecting user modes in software (tool, hand, face discrimination), background elimination, noise elimination.

In some implementations, a compensation can be applied to a model within the observed information. Now with reference to FIG. 3F, one of a variety of techniques for fitting models to observed information in which one or more elements is missing, either due to differences in the object being observed and/or the viewing environment (e.g., noise, occlusions, poor contrast, and so forth) comprises fitting model portion(s) to extremity portion(s) of an observed object and/or fitting model portion(s) to contour segments and properties. One technique for fitting a model are illustrated by block 30 of FIG. 3F which includes determining observed extremities 303, 305 of an object portion(s) 302 in the observed information corresponding to model extremities 313, 315 in a default model 312. A first quality of fit is determined between the observed information and the default model. A model compensation technique is applied to the default model 312 to form a compensated model 322. In one implementation, the compensation technique is to curve a plurality of model extremities under the model because they are likely occluded in the observed information. A second quality of fit is determined between the observed information and the compensated model. A determination is made whether the quality of fit to the compensated model is superior to the quality of fit to the default model. If so, the compensated model is adopted. Otherwise, in the event that the observed information fit the default model better than the compensated model, processing returns to try another compensation technique if available. In some implementations, more than one compensation can be applied to the model to refine the model for various different occlusions, or the like. Other techniques for determining occlusions for the various model portions that can be used in implementations include best fit analysis of the observed against a set of possible compensated models. Further, techniques can be readily created using variations, combinations, or additions of other techniques to the foregoing teachings within the scope of the technology disclosed; see, e.g., U.S. Ser. No. 61/924,193, filed Jan. 6, 2014.

Initialization Refinement

Figure 3G:
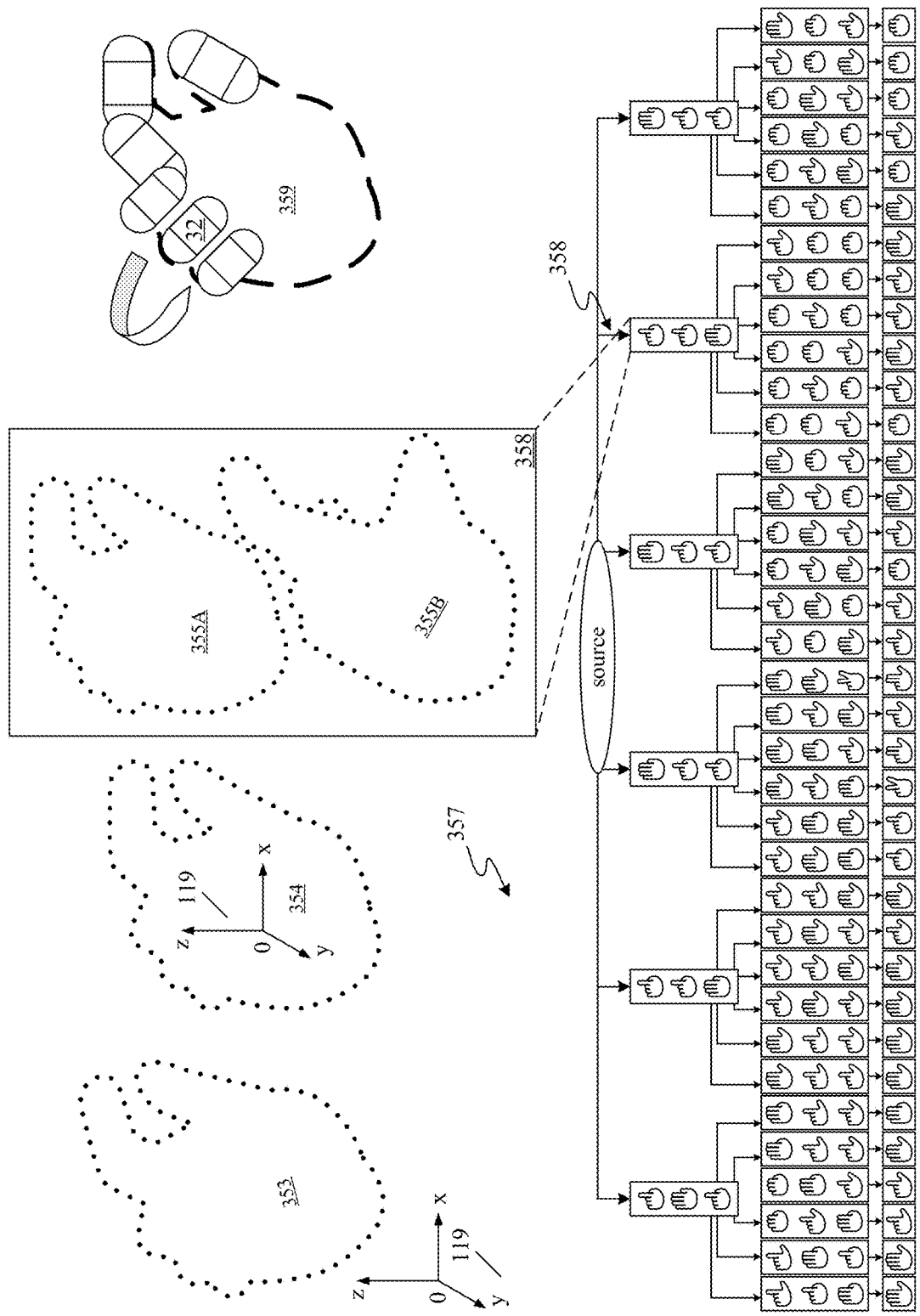

In one implementation, as illustrated by FIG. 3G, predictive information including a model can be initialized to a further refined pose as illustrated. Predictive information can include an estimated model built from a default configuration, a previously used model or the like. Techniques for performing an estimated initialization described above with reference to FIGS. 3A, 3B, 3C, 3D, 3E, and 3F can be applied to ready the estimated model for the initialization process described herein below.

Refining

In one implementation, refining includes passing through decision tree to match a contour to one or more saved sets of contours paired according to the object from which the saved contour set was created. Again with reference to FIG. 3G, observed information 353 including a set of contour points is received by the initialization engine 160 of FIG. 1B. Observed information 353 can be determined from analysis of images captured by sensory analysis system 106 using cameras 102, 104 or by other means. Initialization engine 160 normalizes the set of contour points to form a normalized contour point set 354, which is aligned and rotated with respect to coordinate frame 119 to be centered about the origin. Normalized contour set 354 can be searched in a storage 357 comprising a plurality of comparable objects in a variety of configurations and poses. Storage 357 can be a database or data structure, such as a tree of nodes as illustrated by FIG. 3G. A node 358 having collected poses 355A, 355B most nearly in the configuration presented by normalized contour point set 354 can be selected. Predictive model 359 can be initialized using poses 355A, 355B to inform the system of most likely configurations that the hand in the observed information is presently posed. One or more model portions 32 of predictive information 359 can be adjusted or aligned (as indicated by the arrow) to reflect the poses 355A, 355B suggested by the results of the search.

Figure 8A:
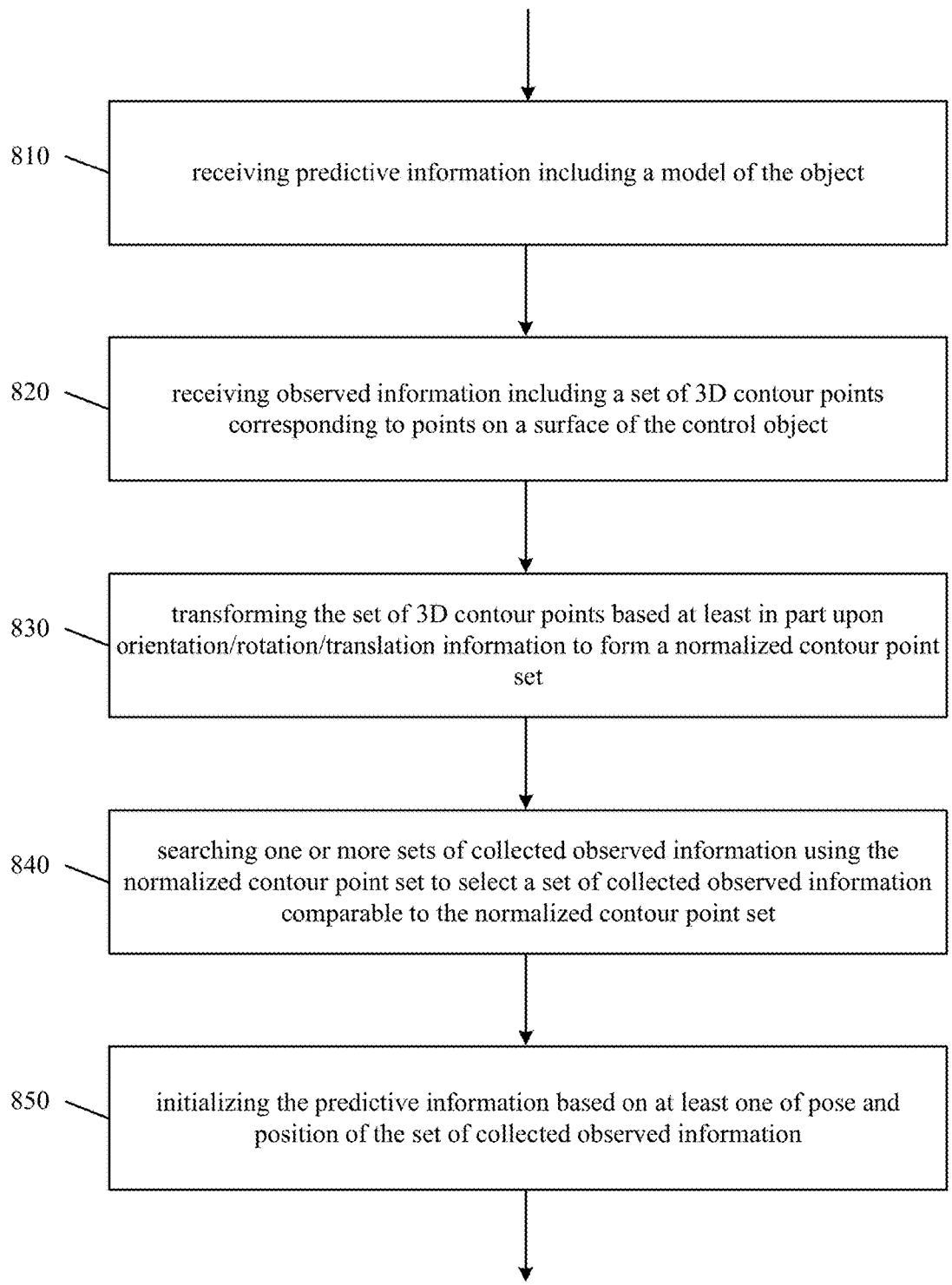
FIGS. 8A-8B show flowcharts of one implementation of initializing predictive information to a further refined pose using one or more sets of collected observed information and training collected observed information.

FIG. 8A shows a flowchart 800A of one implementation of initializing predictive information to a further refined pose using one or more sets of collected observed information determined from information gathered by a sensory analysis system 106. Flowchart 800A can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 8A. Multiple actions can be combined in some implementations. For convenience, this flowchart is described with reference to the system that carries out a method. The system is not necessarily part of the method.

In flowchart 800A, initialization engine 160 of FIG. 1B of sensory analysis system 106 preforms refinement processing on a model component of predictive information automatically based upon imaging of the control object being modelled, and collected observations of like objects in a variety of possible poses and configurations.

In an action 810, predictive information including a model of the object is received. The predictive information can include an estimated model (or proto-model). The proto-model size and orientation can be set using the techniques described herein with reference to FIGS. 3A, 3B, 3C, 3D, 3E, and 3F. Alternatively, or additionally, a previously initialized model can be used as a proto-model. In another alternative, a default configuration having a default size and orientation can be used as the proto-model.

In an action 820, observed information including a set of 3D contour points corresponding to points on a surface of the control object is received. For example, observed information can be obtained from sensory analysis system 106 that captures one or more images of hand 114. The images can be analyzed and contour point set(s) can be extracted.

Figure 9:
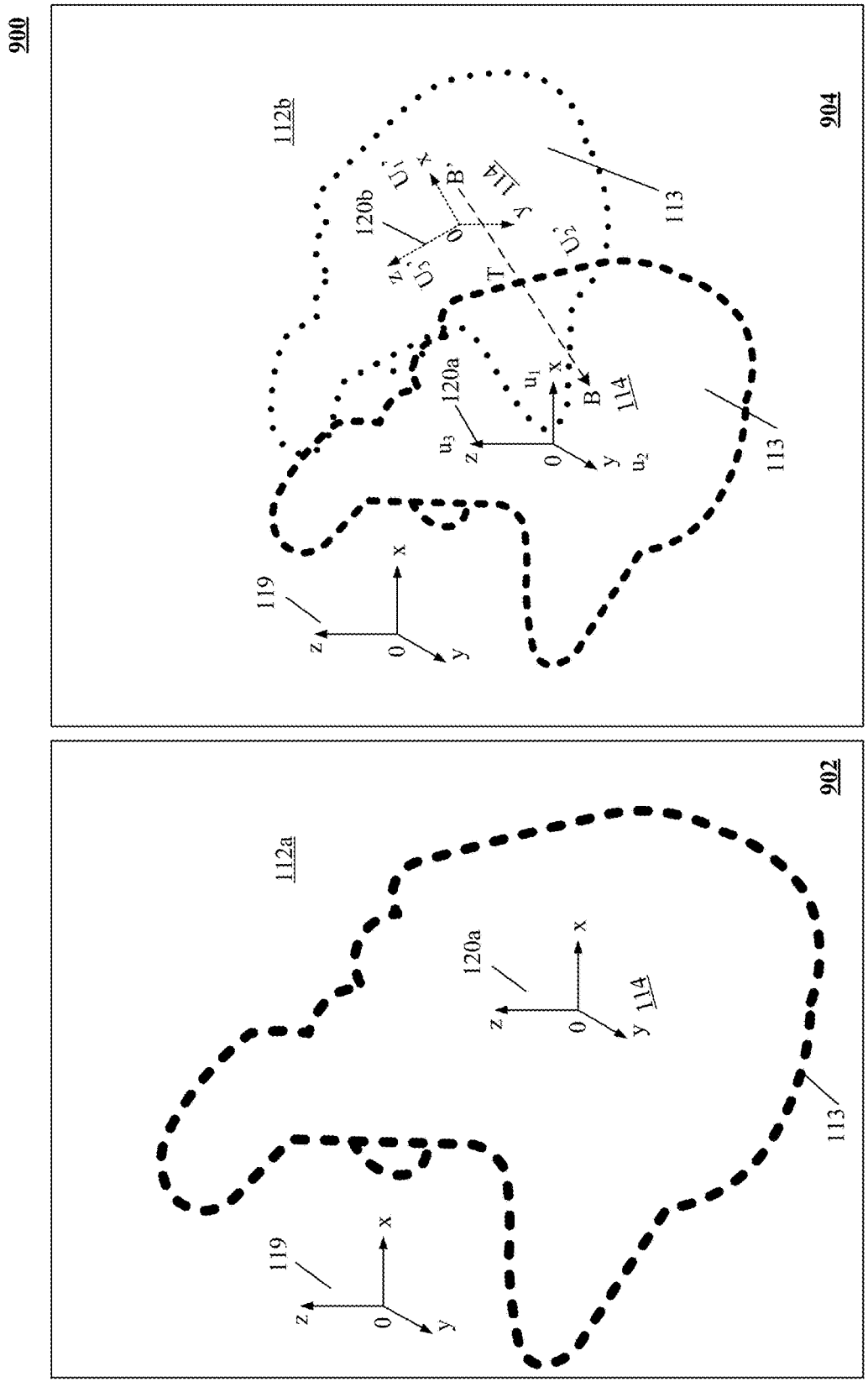
FIG. 9 illustrates acquisition of one or more normalized contour point sets during training and comparison of a set of contour points captured from a subject hand.

In an action 830, the set of contour points is transformed to form a normalized contour point set. Set of contour points are captured relative to the frame of reference of the hand 114 in the image. Transforming forms set of contour points normalized to the reference frame of a model of hand, which enables comparison with sets of collected observed information of comparable objects retrieved from a storage (e.g., tree, linked list, data structure(s), database(s), or combinations thereof). In an implementation, a set of contour points of hand 114 as captured, are transformed to form a normalized contour point set by application of transformation information indicating (e.g., rotation, translation, and/or scaling) of the hand 114 in a captured pose to a known pose that serves as a reference. Once transformed, the normalized contour point set can be compared with normalized contour point set of known comparable objects taught using the known pose (or known poses). As shown in FIG. 9 and discussed further below, in one implementation, a transformation $R^T$ is determined that moves captured (dotted) reference frame 120b to model (dashed) reference frame 120a. Applying the transformation $R^T$ makes the captured (dotted) reference frame 120b lie on top of model (dashed) reference frame 120a.

In an action 840, one or more sets of collected observed information are searched using the normalized contour point set 113 to select a set of collected observed information comparable to the normalized contour point set. In one implementation, a tree of nodes is used to organize the collected observed information and searching is performed by traversing the tree, visiting a node in that data structure. The normalized contour point set is compared to one or more sets of collected observed information associated with the node. A set of collected observed information is selected from the sets of collected observed information of the node having a best correspondence with the normalized contour point set.

In an action 850, the predictive information is initialized based on at least one of pose and position of the set of collected observed information. In one implementation, the initializing includes aligning one or more model portions 32 of FIG. 3G based upon configurations of the one or more sets of collected observed information 355A, 355B associated with the node 358.

Training

Figure 8B:
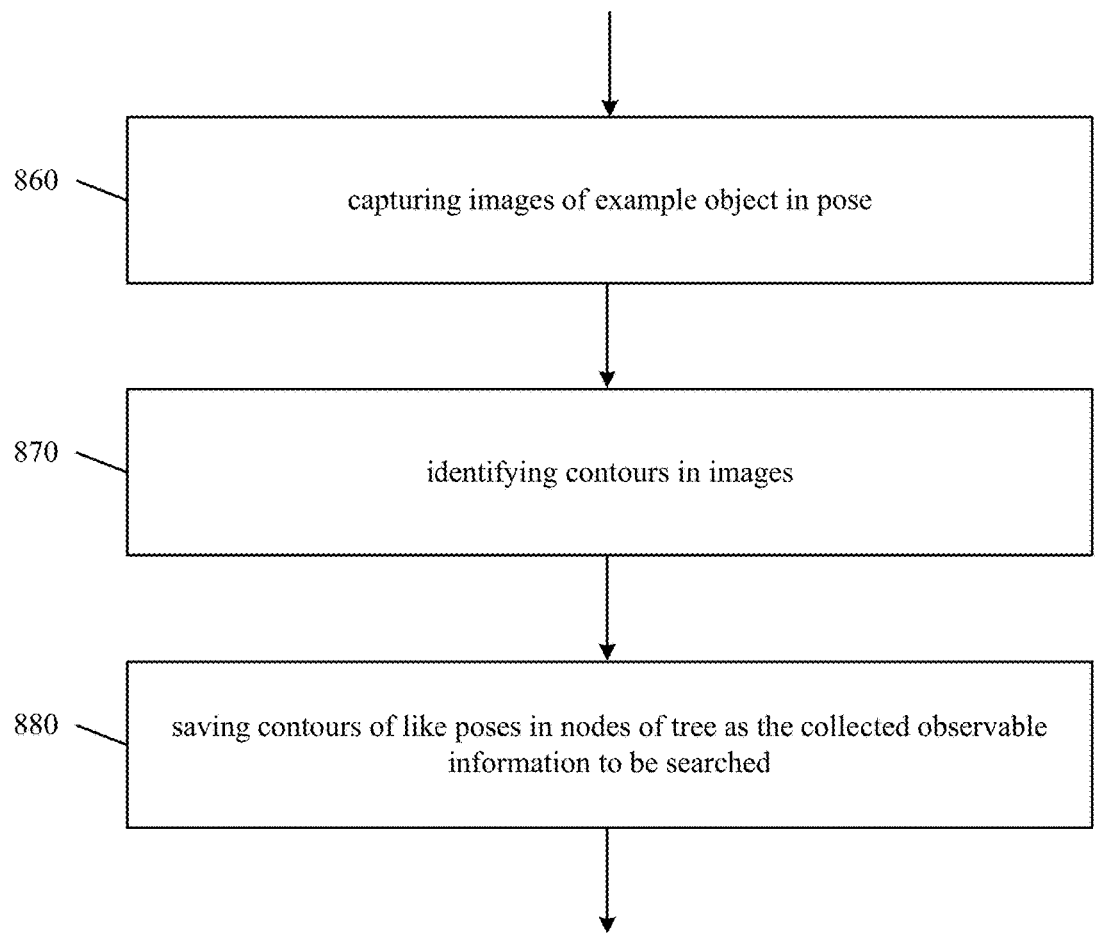

In one implementation, as illustrated by flowchart 800B of FIG. 8B, collected observed information such as sets of contour points can be prepared from example objects and saved. In action 860, collected observed information can be created either from multiple examples of real object images or artificial images of the object or combinations thereof. Contours can be identified in the images in action 870. A tree (or other data structure) can be constructed from the saved sets of contours in action 880. Traversal of the tree or data structure to find saved sets of contours corresponding to, or matching, a set of contours from an imaged object enables quicker, more computationally efficient matches to be achieved in some implementations.

Normalizing and Comparing

Now with reference to FIG. 9, which illustrates acquisition of one or more normalized contour point sets by the system 106 during training (block 902) and comparison (block 904) of set of contour points 113 captured from a subject hand 114. During acquiring of a set of contour points to build a set(s) of collected observed information, as shown by block 902, field of view 112a presented to sensory analysis system 106 at training time $t_0$ includes hand 114 which is to be modeled by the predictive information. At training time $t_0$, the set of contour points 113 (e.g., of hand 114) are determined with respect to model reference frame 120a e.g., by processing image data from cameras 102, 104 viewing hand 114. One or more sets of contour points 113 normalized to model reference frame 120a are captured from the set of contour points 113. A predictive model of the hand 114 in various poses can be constructed based upon one or more sets of collected observed information.

When comparing sets of contour points 113 from a captured pose of a hand 114 used to initialize predictive information, as shown by block 904, at initialization time $t_1$, field of view 112b presented by sensory analysis system 106 at initialization time $t_1$ includes hand 114 in a new apparent position. Not only is the hand 114 in a different position when the predictive model is initialized vs. when the sets of observable information are taught, it is likely that the predictive information is initialized at a different installation of sensory analysis system 106 at a different location when using the sensory analysis system 106 from when characteristics of the hand 114 were originally taught to one of the sensory analysis system 106 installations. Accordingly, the reference frame 120b of the hand as captured during initialization will have moved from an original or starting hand reference frame 120a as described by a transformation $R^T$. It is noteworthy that application of the transformation $R^T$ enables the hand 114 to be compared and/or recognized when rotated as well as translated relative to a taught pose of hand 114. Implementations can provide transforming the position and rotation of reference frame 120b with respect to reference frame 120a and therefore, transforming the position and rotation of contour point set 113 with respect to 120b, at initialization time $t_1$. Implementations can determine the position and rotation of contour point set 113 with respect to 120a from the transformed position and rotation of reference frame 120b with respect to reference frame 120a and the transformed position and rotation of the set of contour points 113 with respect to 120b.

In an implementation, a transformation R is determined that moves dashed line reference frame 120a to dotted line reference frame 120b, without intermediate conversion to an absolute or world frame of reference. Applying the reverse transformation $R^T$ makes the dotted line reference frame 120b lie on top of dashed line reference frame 120a. Then the tracked object 114 will be in the right place from the point of view of dashed line reference frame 120a. (It is noteworthy that $R^T$ is equivalent to $R^{-1}$ for our purposes.) In determining the motion of object 114, sensory analysis system 106 can determine its location and direction by computationally analyzing images captured by cameras 102, 104 and motion information captured by sensors 108, 110. For example, an apparent position of any point on the object (in 3D space) at time $$t = t_0: \begin{bmatrix} x \\ y \\ z \\ 1 \end{bmatrix},$$

can be converted to a real position of the point on the object at time $$t = t_1: \begin{bmatrix} x' \\ y' \\ z' \\ 1 \end{bmatrix}$$

using an affine transform $$\begin{bmatrix} R_{ref} & T_{ref} \\ 0 & 1 \end{bmatrix}$$

from the frame of reference of the device. We refer to the combination of a rotation and translation, which are not generally commutative, as the affine transformation.

The correct location at time $t=t_1$ of a point on the tracked object with respect to device reference frame 120a is given by an inverse affine transformation, e.g., $$\begin{bmatrix} R_{ref}^T & -R_{ref}^T * T_{ref} \\ 0 & 1 \end{bmatrix}$$

as provided for in equation (1):

$$\begin{bmatrix} R_{ref}^T & (-R_{ref}^T) * T_{ref} \\ 0 & 1 \end{bmatrix} * \begin{bmatrix} x \\ y \\ z \\ 1 \end{bmatrix} = \begin{bmatrix} x' \\ y' \\ z' \\ 1 \end{bmatrix} \quad (1)$$

Where:

$R_{ref}^T$—Represents the rotation matrix part of an affine transform describing the rotation transformation from the device reference frame 120a to the device reference frame 120b.

$T_{ref}$—Represents translation of the device reference frame 120a to the device reference frame 120b.

One conventional approach to obtaining the Affine transform R (from axis unit vector u=($u_x$, $u_y$, $u_z$), rotation angle θ) method. Wikipedia, at http://en.wikipedia.org/wiki/Rotation_matrix, Rotation matrix from axis and angle, on Jan. 30, 2014, 20:12 UTC, upon which the computations equation (2) are at least in part inspired:

$$R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_z u_x(1-\cos\theta) - u_y\sin\theta & u_z u_y(1-\cos\theta) + u_x\sin\theta & \cos\theta + u_z^2(1-\cos\theta) \end{bmatrix} \quad (2)$$

$$R^T = \begin{bmatrix} \cos\theta + u_x^2(1-\cos\theta) & u_y u_x(1-\cos\theta) + u_z\sin\theta & u_z u_x(1-\cos\theta) - u_y\sin\theta \\ u_x u_y(1-\cos\theta) - u_z\sin\theta & \cos\theta + u_y^2(1-\cos\theta) & u_z u_y(1-\cos\theta) + u_x\sin\theta \\ u_x u_z(1-\cos\theta) + u_y\sin\theta & u_y u_z(1-\cos\theta) - u_x\sin\theta & \cos\theta + u_z^2(1-\cos\theta) \end{bmatrix}$$

$$-R^T = \begin{bmatrix} -\cos\theta - u_x^2(1-\cos\theta) & -u_y u_x(1-\cos\theta) - u_z\sin\theta & -u_z u_x(1-\cos\theta) + u_y\sin\theta \\ -u_x u_y(1-\cos\theta) + u_z\sin\theta & -\cos\theta - u_y^2(1-\cos\theta) & -u_z u_y(1-\cos\theta) - u_x\sin\theta \\ -u_x u_z(1-\cos\theta) - u_y\sin\theta & -u_y u_z(1-\cos\theta) + u_x\sin\theta & -\cos\theta - u_z^2(1-\cos\theta) \end{bmatrix}$$

$$T = \begin{bmatrix} a \\ b \\ c \end{bmatrix}$$

is a vector representing a translation of the object with respect to origin of the coordinate system of the translated frame, $$-R^T * T = \begin{bmatrix} (-\cos\theta - u_x^2(1-\cos\theta))(a) + (-\cos\theta - u_y^2(1-\cos\theta))(b) + (-u_z u_x(1-\cos\theta) + u_y\sin\theta)(c) \\ (-u_x u_y(1-\cos\theta) + u_z\sin\theta)(a) + (-\cos\theta - u_y^2(1-\cos\theta))(b) + (-u_z u_y(1-\cos\theta) - u_x\sin\theta)(c) \\ (-u_x u_z(1-\cos\theta) - u_y\sin\theta)(a) + (-u_y u_z(1-\cos\theta) + u_x\sin\theta)(b) + (-\cos\theta - u_z^2(1-\cos\theta))(c) \end{bmatrix}$$

In another example, an apparent orientation and position of the object at time t=$t_0$: vector pair $$\begin{bmatrix} R_{obj} & T_{obj} \\ 0 & 1 \end{bmatrix},$$

can be converted to a real orientation and position of the object at time $$t = t_1: \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

The correct orientation and position of the tracked object with respect to device reference frame at time t=$t_0$ (120a) is given by an inverse affine transformation, e.g., $$\begin{bmatrix} R_{ref}^T & -R_{ref}^T * T_{ref} \\ 0 & 1 \end{bmatrix}$$

as provided for in equation (3):

$$\begin{bmatrix} R_{ref}^T & (-R_{ref}^T) * T_{ref} \\ 0 & 1 \end{bmatrix} * \begin{bmatrix} R_{obj} & T_{obj} \\ 0 & 1 \end{bmatrix} = \begin{bmatrix} R'_{obj} & T'_{obj} \\ 0 & 1 \end{bmatrix} \quad (3)$$

Where:

$R^T_{ref}$—Represents the rotation matrix part of an affine transform describing the rotation transformation from the device reference frame 120a to the device reference frame 120b.

$R_{obj}$—Represents a matrix describing the rotation at $t_0$ of the object with respect to the device reference frame 120b.

$R'_{obj}$—Represents a matrix describing the rotation at $t_1$ of the object with respect to the device reference frame 120a.

$T_{ref}$—Represents a vector translation of the device reference frame 120a to the device reference frame 120b.

$T_{obj}$—Represents a vector describing the position at $t_0$ of the object with respect to the device reference frame 120b.

$T'_{obj}$—Represents a vector describing the position at $t_1$ of the object with respect to the device reference frame 120a.

In a yet further example, an apparent orientation and position of the object at time $t=t_0$: affine transform $$\begin{bmatrix} R_{obj} & T_{obj} \\ 0 & 1 \end{bmatrix},$$

can be converted to a real orientation and position of the object at time $$t = t_1: \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

Furthermore, the position and orientation of the initial reference frame with respect to a (typically) fixed reference point in space can be determined using an affine transform $$\begin{bmatrix} R_{init} & T_{init} \\ 0 & 1 \end{bmatrix}.$$

The correct orientation and position of the tracked object with respect to device reference frame at time $t=t_0$ (120a) is given by an inverse affine transformation, e.g., $$\begin{bmatrix} R_{init}^T & (-R_{init}^T) * T_{init} \\ 0 & 1 \end{bmatrix}$$

as provided for in equation (4):

$$\begin{bmatrix} R_{init}^T & (-R_{init}^T) * T_{init} \\ 0 & 1 \end{bmatrix} \quad (4)$$

$$\begin{bmatrix} R_{ref}^T & (-R_{ref}^T) * T_{ref} \\ 0 & 1 \end{bmatrix} * \begin{bmatrix} R_{obj} & T_{obj} \\ 0 & 1 \end{bmatrix} = \begin{bmatrix} R'_{obj} & T'_{obj} \\ 0 & 1 \end{bmatrix}$$

Where:

$R^T_{init}$—Represents a rotation matrix part of an affine transform describing the rotation transformation at $t_0$ from the world reference frame 119 to the device reference frame 120a.

$R^T_{ref}$—Represents the rotation matrix part of an affine transform describing the rotation transformation from the device reference frame 120a to the device reference frame 120b.

$R_{obj}$—Represents a matrix describing the rotation of the object at $t_0$ with respect to the device reference frame 120b.

$R'_{obj}$—Represents a matrix describing the rotation of the object at $t_1$ with respect to the device reference frame 120a.

$T_{init}$—Represents a vector translation at $t_0$ of the world reference frame 119 to the device reference frame 120a.

$T_{ref}$—Represents a vector translation at $t_1$ of the device reference frame 120a to the device reference frame 120b.

$T_{obj}$—Represents a vector describing the position at $t_0$ of the object with respect to the device reference frame 120b.

$T'_{obj}$—Represents a vector describing the position at $t_1$ of the object with respect to the device reference frame 120a.

Translation vector T can be determined using any of various techniques. For example, vector T can be determined from the difference between position information of some convenient point of reference B (e.g., center of palm, thumb tip, normalize widths or other dimensions of the hand, other points and/or dimensions, or combinations thereof) relative to the hand 114 as captured during initialization (shown schematically in FIG. 9 by point B' of reference frame 120b) and a corresponding point (shown by point B of reference frame 120a) relative to the hand 114 when taught that serves as a reference point.

In some implementations, the technology disclosed can build a world model with an absolute or world frame of reference. The world model can include representations of object portions (e.g. objects, edges of objects, prominent vortices) and potentially depth information when available from a depth sensor, depth camera or the like, within the viewpoint of the virtual or augmented reality head mounted sensor. The system can build the world model from image information captured by the cameras of the sensor. Points in 3D space can be determined from the stereo-image information are analyzed to obtain object portions. These points are not limited to a hand or other control object in a foreground; the points in 3D space can include stationary background points, especially edges. The model is populated with the object portions.

When the sensor moves (e.g., the wearer of a wearable headset turns her head) successive stereo-image information is analyzed for points in 3D space. Correspondences are made between two sets of points in 3D space chosen from the current view of the scene and the points in the world model to determine a relative motion of the object portions. The relative motion of the object portions reflects actual motion of the sensor.

Differences in points are used to determine an inverse transformation (the $[R_0^T - R_1^T]$) between model position and new position of object portions. In this affine transform, $R^T$ describes the rotational portions of motions between camera and object coordinate systems, and T describes the translational portions thereof.

The system then applies an inverse transformation of the object corresponding to the actual transformation of the device (since the sensor, not the background object moves) to determine the translation and rotation of the camera. Of course, this method is most effective when background objects are not moving relative to the world frame (i.e., in free space).

The model can be updated whenever we detect new points not previously seen in the model. The new points are added to the model so that it continually grows.

Of course, embodiments can be created in which (1) device cameras are considered stationary and the world model is considered to move; or (2) the device cameras are considered to be moving and the world model is considered stationary.

The use of a world model described above does not require any gyroscopic, accelerometer or magnetometer sensors, since the same cameras in a single unit (even the same cameras) can sense both the background objects and the control object. In any view where the system can recognize elements of the model, it can re-localize its position and orientation relative to the model and without drifting from sensor data. In some embodiments, motion sensors can be used to seed the frame to frame transformation and therefore bring correspondences between the rendered virtual or augmented reality scenery closer to the sensed control object, making the result less ambiguous (i.e., the system would have an easier time determining what motion of the head had occurred to result in the change in view from that of the model). In a yet further embodiment, sensor data could be used to filter the solution above so that the motions appear to be smoother from frame to frame, while still remaining impervious to drift caused by relying upon motion sensors alone.

Figure 3H:
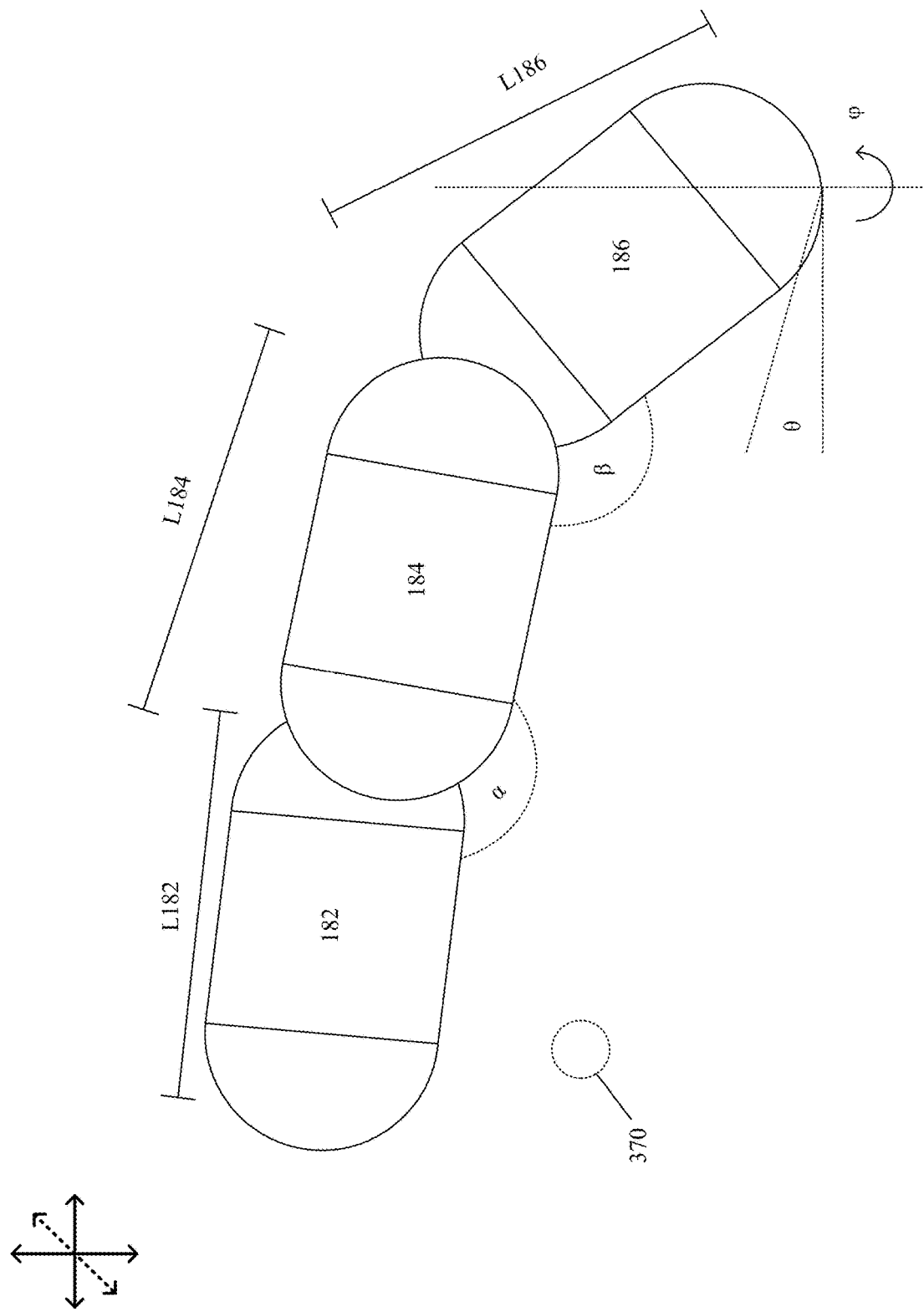
Figure 3I:
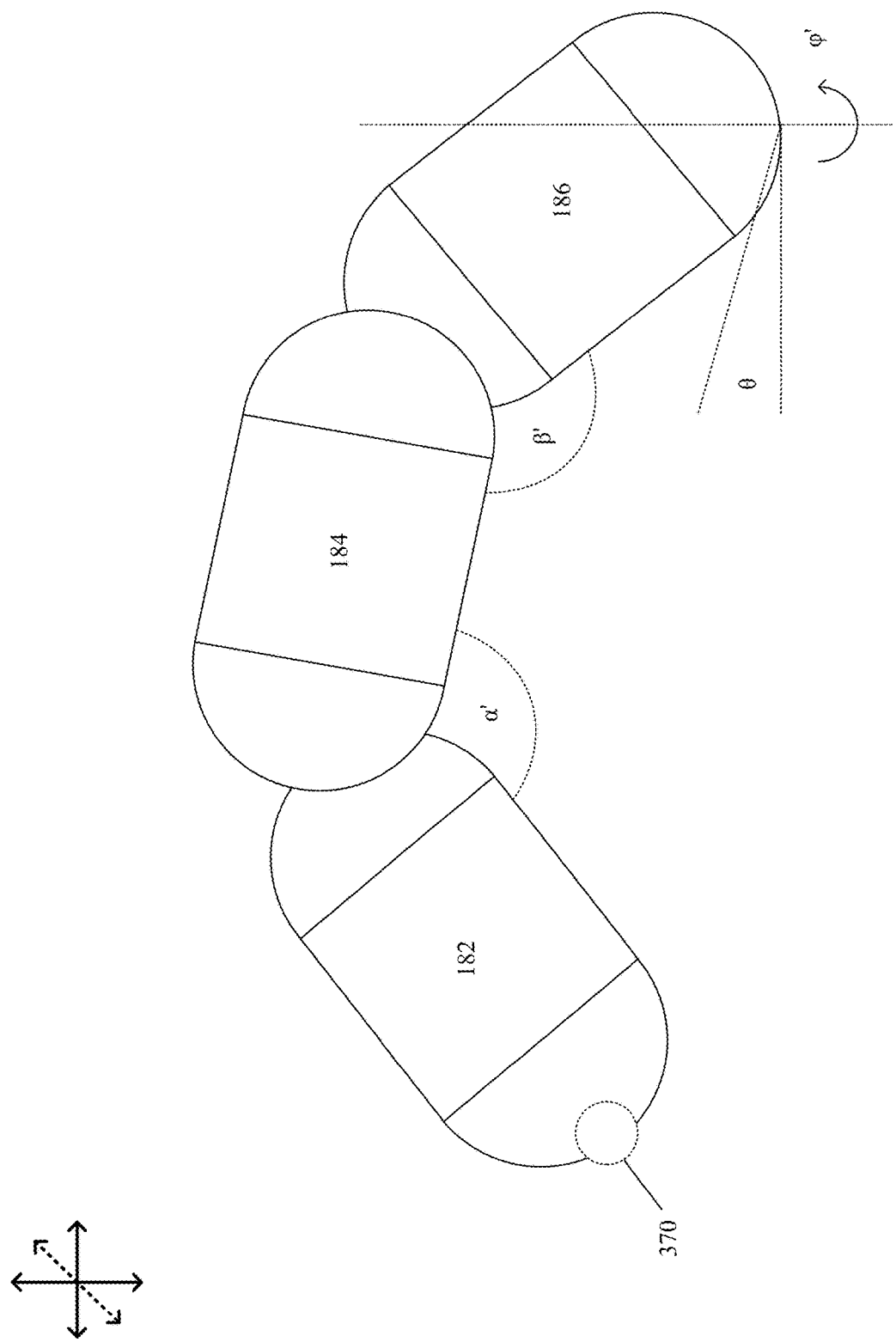

In another implementation, as illustrated by FIGS. 3H and 3I, a fingertip position can be determined from the image and reconstructed in 3D as illustrated. In FIG. 3H, a point 370 is an observed fingertip. Model capsules 182, 184, 186 are aligned such that the tip of capsule 182 is coincident with the location in space of point 370 determined from the observed information. In one technique, angle α and angle β are allowed to be set equal, which enables a closed form solution for θ and φ as well as angle α and angle β.

$$s^2=2ac(-2a^2-2c^2+b^2-2a-2b-2c+4ac)+-2b^2(a^2+c^2)$$

$$\alpha=\beta=\tan 2^{-1}s-(a+c)b$$

$$\varphi=x_1/\mathrm{norm}(x)$$

$$\theta=x_2/\mathrm{norm}(x)$$

Wherein norm(x) is described as the norm of a 3D point x (370 in FIG. 3H) and a, b and c are capsule lengths L182, L184, L186 in FIG. 3I.

Association

Figure 4:
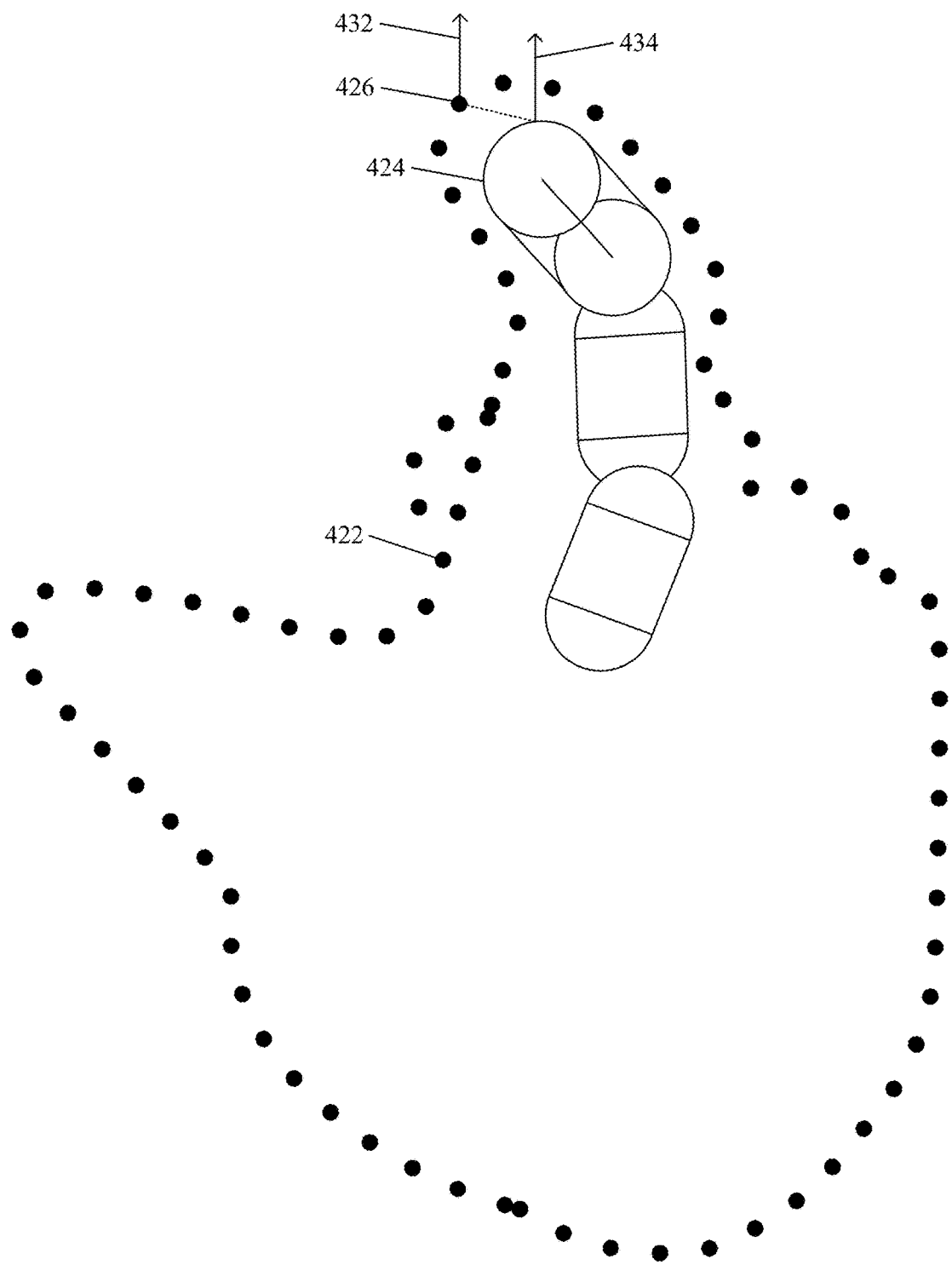
FIG. 4 illustrates one implementation of improving capsule representation of predictive information in accordance with implementations of the technology disclosed.

FIG. 4 illustrates one implementation of improving capsule representation of predictive information. In an implementation, observation information 422 including observation of the control object can be compared against the model at one or more of periodically, randomly or substantially continuously (i.e., in real time). Observational information 422 can include, without limitation, observed values of attributes of the control object corresponding to the attributes of one or more model subcomponents in the predictive information for the control object. In an implementation, comparison of the model 424 with the observation information 422 provides an error indication 426 (also referred to as "variance"). In an implementation, an error indication 426 can be computed by first associating a set A of three dimensional points with a corresponding normal direction 432 to a set B of three dimensional points with a corresponding normal direction 434 on the subcomponents surface. The association is done in a manner that assures that each paired point in set A and B has the same associated normal. An error can then be computed by summing the distances between each point in set A and B. This error is here on referred to as the association error; see, e.g., U.S. Ser. No. 61/873,758, filed Sep. 4, 2013.

Alignment

Predictive information of the model can be aligned to the observed information using any of a variety of techniques. Aligning techniques bring model portions (e.g., capsules, capsuloids, capsoodles) into alignment with the information from the image source (e.g., edge samples, edge rays, interior points, 3D depth maps, and so forth). In one implementation, the model is rigidly aligned to the observed information using iterative closest point (ICP) technique. The model can be non-rigidly aligned to the observed information by sampling techniques.

One ICP implementation includes finding an optimal rotation R and translation T from one set of points A to another set of points B. First each point from A is matched to a point in set B. A mean square error is computed by adding the error of each match:

$$MSE=\mathrm{sqrt}(\Sigma(R*x_i+T-y_i)^{t}*(R*x_i+T-y_i))$$

An optimal R and T are computed and applied to the set of points A or B, according to some implementations.

In order to enable the ICP to match points to points on the model, a capsule matching technique is employed. One implementation of the capsule matching includes a class that "grabs" the set of data and computes the closest point on each tracked hand (using information like the normal). Then, the minimum of those closest points is associated to the corresponding hand and saved in a structure called Hand Data. Other points that don't meet a minimal distance threshold are marked as unmatched.

In an implementation, rigid transformations and/or non-rigid transformations can be composed. One example composition implementation includes applying a rigid transformation to predictive information. Then an error indication can be determined, and an error minimization technique such as described herein can be applied. In an implementation, determining a transformation can include calculating a rotation matrix that provides a reduced RMSD (root mean squared deviation) between two paired sets of points. One implementation can include using Kabsch Algorithm to produce a rotation matrix. The Kabsch algorithm is used to find an optimal rotation R and translation T that minimizes the error using the following formula:

$$RMS=\mathrm{sqrt}(\Sigma(R*xi+T-yi)t*(R*xi+T-yi))wi$$

The transformation (both R and T) are applied rigidly to the model. The capsule matching and rigid alignment is repeated until convergence is achieved between model 424 with observation information 422. In one implementation, the Kabsch is extended to ray or covariances by minimizing the error using the following formula:

$$\Sigma(R*xi+T-yi)t*Mi*(R*xi+T-yi)$$

In the formula above, $M_i$ is a positive definite symmetric matrix. In an implementation and by way of example, one or more force lines can be determined from one or more portions of a virtual surface.

One implementation applies non-rigid alignment to the observed information by sampling the parameters of each finger. A finger is represented by a 3D vector where the entry of each vector is a pitch, yaw and bend of the finger. The Pitch and Yaw can be defined trivially. The bend is the angle between the first and second capsule and the second and third capsule which are set to be equal. The mean of the samples weighted by the RMS is taken to be the new finger parameter, according to one implementation.

After rigid alignment, all data that has not been assigned to a hand, can be used to initialize a new object (hand or tool).

In an implementation, predictive information can include collision information concerning two or more capsoloids. By means of illustration, several possible fits of predicted information to observed information can be removed from consideration based upon a determination that these potential solutions would result in collisions of capsoloids.

In an implementation, a relationship between neighboring capsoloids, each having one or more attributes (e.g., determined minima and/or maxima of intersection angles between capsoloids) can be determined. In an implementation, determining a relationship between a first capsoloid having a first set of attributes and a second capsoloid having a second set of attributes includes detecting and resolving conflicts between first attribute and second attributes. For example, a conflict can include a capsoloid having one type of angle value with a neighbor having a second type of angle value incompatible with the first type of angle value. Attempts to attach a capsoloid with a neighboring capsoloid having attributes such that the combination will exceed what is allowed in the observed—or to pair incompatible angles, lengths, shapes, or other such attributes—can be removed from the predicted information without further consideration.

Correction

In one implementation, given a position, raw image information and fast lookup table can be used to find a look up region that gives constant time of computation of the closest point on the contour. Fingertip positions are used to compute point(s) on the contour which can be then used to determine whether the finger is extended or non-extended. A signed distance function can be used to determine whether points lie outside or inside a hand region. An implementation checks to see if points are inside or outside the hand region.

Abstracting

In one implementation, information can be abstracted from the model. For example, velocities of a portion of a hand (e.g., velocity of one or more fingers, and a relative motion of a portion of the hand), state (e.g., position, an orientation, and a location of a portion of the hand), pose (e.g., whether one or more fingers are extended or non-extended, one or more angles of bend for one or more fingers, a direction to which one or more fingers point, a configuration indicating a pinch, a grab, an outside pinch, and a pointing finger), and whether a tool or object is present in the hand can be abstracted in various implementations.

Determining and Interpreting Command Identification

Figure 5:
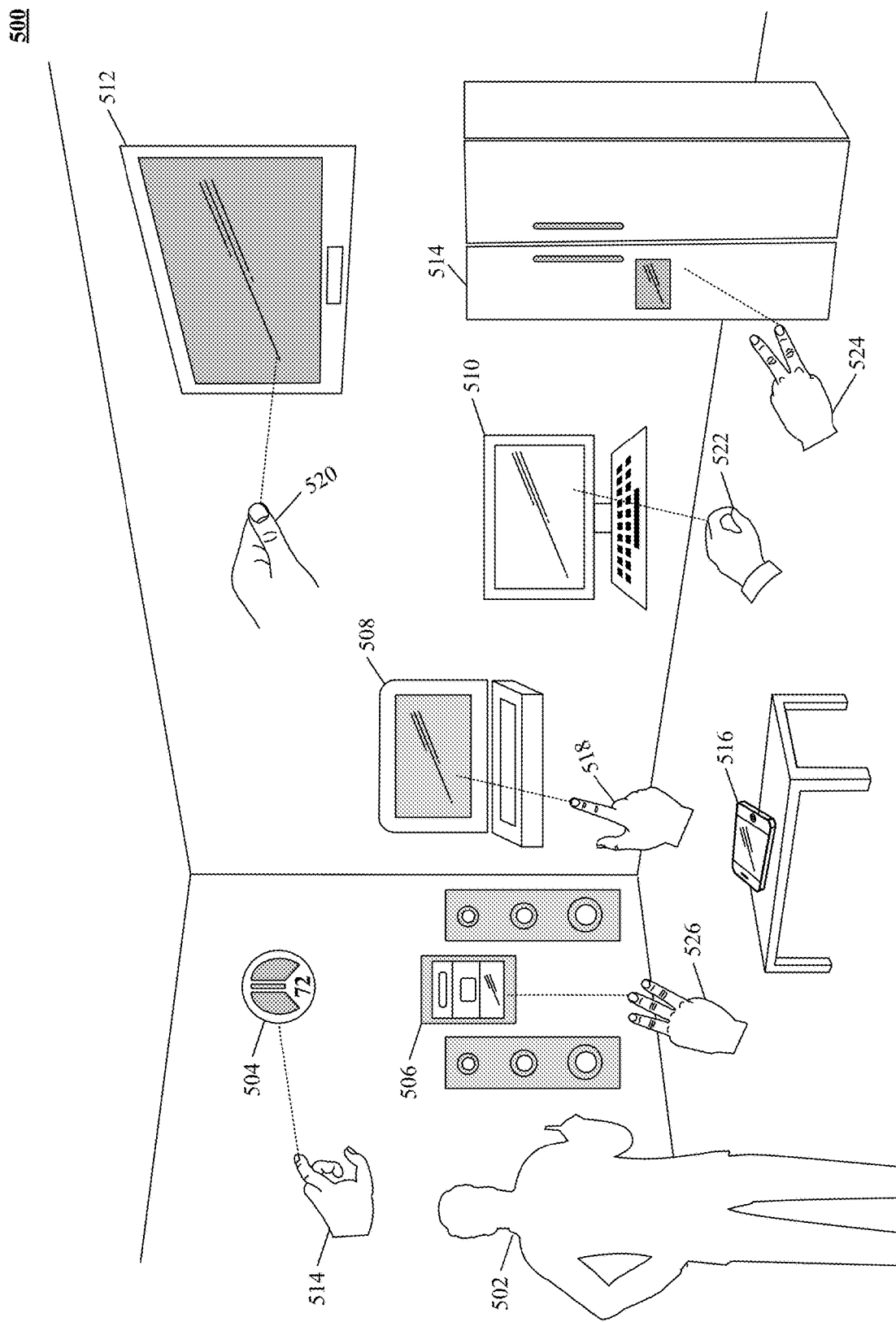
FIG. 5 shows one implementation of a pervasive computing environment in which a machine sensory device can be used.

In one implementation, a method of providing command input to a machine under control by tracking hands (or other body portions, alone or in conjunction with tools) using a sensory machine control system includes capturing sensory information for a human body portion within a field of interest. A tracking model is determined from the sensory information by analyzing images, alone or in conjunction with non-imaging sensory information, to yield 3D information suitable for defining a capsule model of the subject being imaged. The 3D information is associated to one or more capsules in a model. The capsule model is aligned (rigidly, non-rigidly, or combinations thereof) with the 3D information. Information from the model is abstracted to detect a variance and/or a state of the subject being imaged. From the variance and/or state, it is determined whether the subject being imaged has made a gesture in the 3D sensory space and the gesture is interpreted to provide command input to a machine under control. FIG. 5 shows one implementation of a pervasive computing environment 500 in which a machine sensory device might be used. In one implementation, pervasive computing environment 500 can include various home automation systems such as lighting systems, in-home monitoring systems, security systems, appliance systems, VoIP phone systems, other phone systems, other home automation systems, or any combination thereof. In a particular implementation, smart phone 516 equipped with a motion sensory control device is adapted to control each of the home automation systems, including but not limited to entertainment unit 506, thermostat and HVAC control 504, laptop computer 508, desktop computer 510, television 512, and refrigerator 514.

In other implementations, smart phone 516 can include one or more sensors to, e.g., detect acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), WiFi, or other electromagnetic signals or fields. Thus, for example, smart phone 516 can include temperature sensor(s), humidity sensor(s), hazard-related sensor(s) or other environmental sensor(s), accelerometer(s), microphone(s), optical sensors up to and including camera(s) (e.g., charged-coupled-device or video cameras), active or passive radiation sensors, GPS receiver(s) or radio-frequency identification detector(s). While FIG. 5 illustrates an implementation with a motion sensory control device, many implementations can include multiple sensors. In some instances, smart phone 516 includes one or more primary sensors and one or more secondary sensors. The primary sensor(s) can sense data central to the core operation of the device (e.g., interpreting gestures performed in the environment 500). The secondary sensor(s) can sense other types of data (e.g., light, acceleration, or sound).

In other implementations, one or more user-interface components 138 in smart phone 516 can be used to present information to a user 502 via a visual display (e.g., a thin-film-transistor display or organic light-emitting-diode display) and/or an audio speaker. In one implementation, user-interface components 138 can receive information from the user 502 through a touchscreen, buttons, scroll component (e.g., a movable or virtual ring component), microphone, and/or camera (e.g., to detect gestures).

As shown in FIG. 5, user 502 can select a device from among the different devices in the environment 500 by performing a gesture and/or and other body movements. In one implementation, pure gestures, or gestures in combination with voice recognition, and/or a virtual or real keyboard in combination with the gestures can be used to select a device. In another implementation, a control console that recognizes gestures can be used to control an entire home, school, university, factory floor, office or other place of business.

In some implementations, user 502 can raise an arm, utter a verbal command, perform an optical command, or make different poses using hands and fingers (e.g., 'one finger point', 'one finger click', 'two finger point', 'two finger click', 'prone one finger point', 'prone one finger click', 'prone two finger point', 'prone two finger click', 'medial one finger point', 'medial two finger point') to indicate an intent to interact with a particular device in the environment 500. In other implementations, a point and grasp gesture can be used to move a cursor on a display of a device in the environment 500, verbal commands can be used to select a function, eye movements can be used to move a cursor, and blinking can indicate a selection.

In yet other implementations, the gestures can control the different devices in environment 500 using a graphical display or other feedback device, a set of menu elements, selection elements, and pan and zoom capabilities. Navigation through the devices can be consistent from high-level selection of target device down to manipulation of individual selection elements. In one example, with a particular device selected following a detection of a vertical, thumb-up, one-finger point, a pointing cursor and contextual menu elements for the current device are activated. The cursor position is driven by the movement and/or aim of the index finger. Basic selection and control over button, slider, and menu elements is accomplished by positioning the pointer within an element and moving the thumb to the down/click (aligned with index finger) position. Moving the cursor off the screen to the medial side brings up a high-level menu list, with cursor movement constrained to two dimensions (up and down). Selecting an option from the high-level menu acts to change devices (e.g., from the television to the refrigerator).

In some other implementations, the gestures or body movements can also be used to switch a device on or off. After selecting a device, user 502 performs a subsequent gesture such as a downward or upward swipe of hand and/or finger(s) to power on or off a device. For instance, a finger flip up or down can be used to turn lights, television, or refrigerator on or off.

Other examples of ambient services performed using gestural interaction in environment 500 can involve the filling of baths, pools and spas and the maintenance of a desired temperature in those facilities, as well as the control of any pumps associated with those facilities. They can also control individual devices and appliances such as kitchen appliances, exhaust fans, humidifiers, and dehumidifiers. In some implementations, they can control motorized devices such as skylights, draperies, furniture, walls, screens, ceilings, awnings, physical security barriers, door locks, and others. In other implementations, they can also control answering machines, voice mail systems, and provide maintenance reminders and perform functions such as telephone answering, controlling fountains or in-ground sprinkler systems, controlling kitchen and other appliances, controlling motorized drapes, windows and skylights, opening of locked doors and the scheduling of these functions. In yet other implementations, these ambient services can be applied to other pervasive environments such as boats, aircraft, office suites, conference rooms, auditoriums, classrooms, theaters, hotels, hospitals, and retirement homes. Again with reference to FIG. 5, one implementation includes different paradigm-setting gestures (514, 526, 518, 520, 522, 524, 526) that set device-specific control paradigms to control responsiveness of various devices in a pervasive computing environment 500. As shown in FIG. 5, different gestures such as a grip-and-extend-again motion of two fingers of a hand, grip-and-extend-again motion of a finger of a hand, or holding a first finger down and extending a second finger can be used to determine a context for interpreting subsequent gestures and controlling a selected device. For example, a vertical finger swipe can indicate a user intent to increase volume of a television or increase brightness of the television display. However, paradigm-setting gestures (514, 526, 518, 520, 522, 524, 526) define how various gestures cause on-screen actions on the different devices and/or control their manual responsiveness. In another example relating to a pervasive augmented environment, paradigm-setting gestures (514, 526, 518, 520, 522, 524, 526) can define interaction modes to interact with different virtual screens or objects. For instance, when the user is interacting with a virtual newspaper active on a virtual screen, a forehand sweep can result in an increment change of an electronic page in the virtual newspaper, whereas the same gesture can result in collision of virtual cars in a virtual gaming environment generated by the same virtual screen. In a particular implementation, smart phone 516 equipped with a motion sensory control device is adapted to control each of the home automation systems, including but not limited to entertainment unit 506, thermostat and HVAC control 504, laptop computer 508, desktop computer 510, television 512, and refrigerator 514.

Image Capture

Figure 6A:
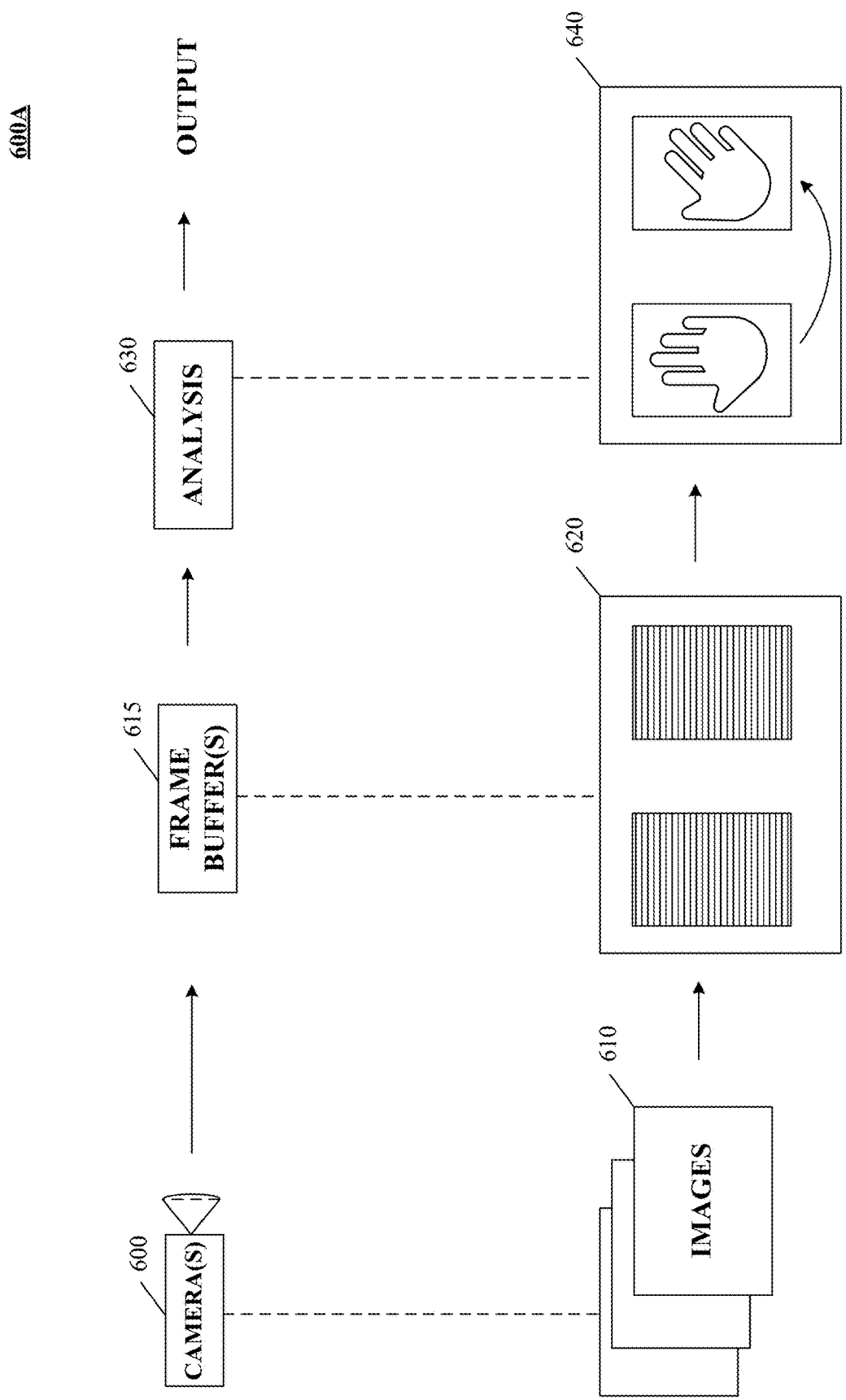
FIGS. 6A and 6B depict the basic operations and functional units involved in motion capture and image analysis in accordance with implementations of the technology disclosed.

FIG. 6A depicts the basic operations and functional units 600A involved in motion capture and image analysis in accordance with implementations of the technology disclosed. As shown in FIG. 6A, the camera(s) 600 record digital images 610 of a scene. Each digital image is captured as an array of pixel values by the associated camera's image sensor, and the digital images are transferred—either in "raw" format or following conventional preprocessing—to one or more frame buffers 615. A frame buffer is a partition or dedicated segment of volatile memory that stores a "bitmapped" image frame 620 corresponding to the pixel values of an image as output by the camera 600 that recorded it. The bitmap is generally organized conceptually as a grid, with each pixel mapped one-to-one or otherwise to output elements of a display. It should be stressed, however, that the topology of how memory cells are physically organized within the frame buffers 615 does not matter and need not conform directly to the conceptual organization.

The number of frame buffers included in a system generally reflects the number of images simultaneously analyzed by the analysis system or module 630, which is described in greater detail below. Briefly, analysis module 630 analyzes the pixel data in each of a sequence of image frames 620 to locate objects therein and track their movement over time (as indicated at 640). This analysis can take various forms, and the algorithm performing the analysis dictates how pixels in the image frames 620 are handled. For example, the algorithm implemented by analysis module 630 can process the pixels of each frame buffer on a line-by-line basis—i.e., each row of the pixel grid is successively analyzed. Other algorithms can analyze pixels in columns, tiled areas, or other organizational formats.

In various implementations, the motion captured in a series of camera images is used to compute a corresponding series of output images for display on the display 138. For example, camera images of a moving hand can be translated into a wire-frame or other graphic depiction of the hand by the processor 132. Alternatively, hand gestures can be interpreted as input used to control a separate visual output; by way of illustration, a user can be able to use upward or downward swiping gestures to "scroll" a webpage or other document currently displayed, or open and close her hand to zoom in and out of the page. In any case, the output images are generally stored in the form of pixel data in a frame buffer, e.g., one of the frame buffers 615. A video display controller reads out the frame buffer to generate a data stream and associated control signals to output the images to the display 138. The video display controller can be provided along with the processor 132 and memory 134 onboard the motherboard of the computer 100B, and can be integrated with the processor 132 or implemented as a co-processor that manipulates a separate video memory. As noted, the computer 100B can be equipped with a separate graphics or video card that aids with generating the feed of output images for the display 138. The video card generally includes a graphics processing unit (GPU) and video memory, and is useful, in particular, for complex and computationally expensive image processing and rendering. The graphics card can include the frame buffer and the functionality of the video display controller (and the on-board video display controller can be disabled). In general, the image-processing and motion-capture functionality of the system can be distributed between the GPU and the main processor 132 in various ways.

Suitable algorithms for motion-capture program 144 are described below as well as, in more detail, in U.S. patent application Ser. No. 13/414,485, filed on Mar. 7, 2012 and Ser. No. 13/742,953, filed on Jan. 16, 2013, and U.S. Provisional Patent Application No. 61/724,091, filed on Nov. 8, 2012, which are hereby incorporated herein by reference in their entirety. The various modules can be programmed in any suitable programming language, including, without limitation high-level languages such as C, C++, C#, OpenGL, Ada, Basic, Cobra, FORTRAN, Java, Lisp, Perl, Python, Ruby, or Object Pascal, or low-level assembly languages.

Figure 6B:
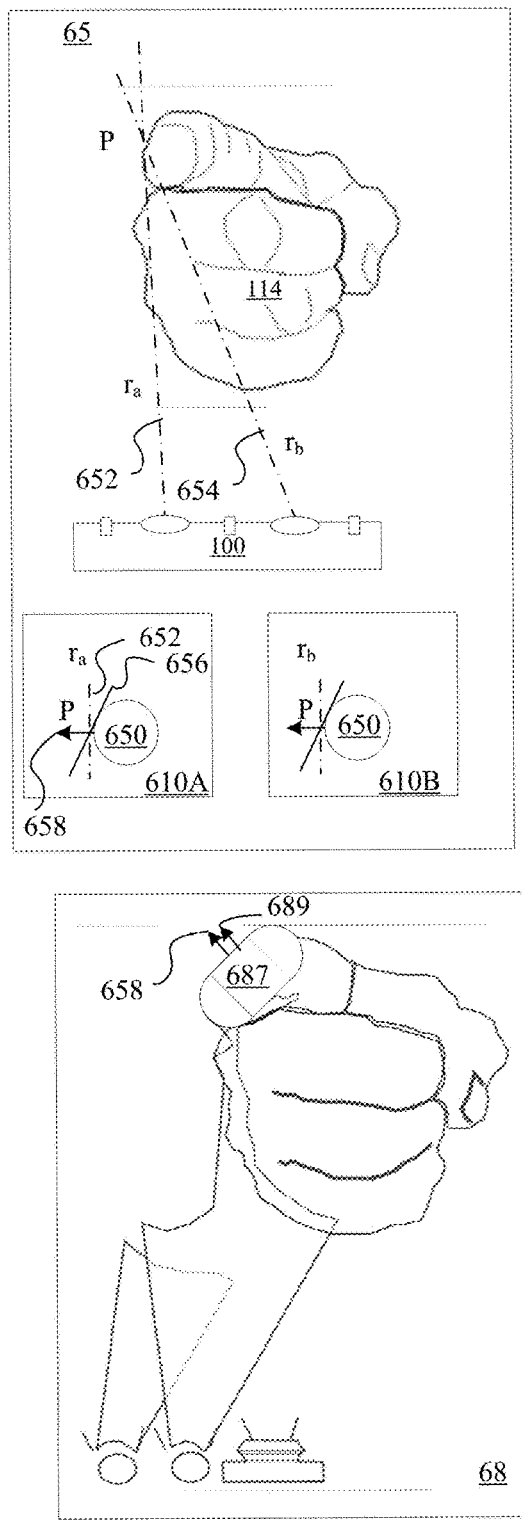
Figure 6B:
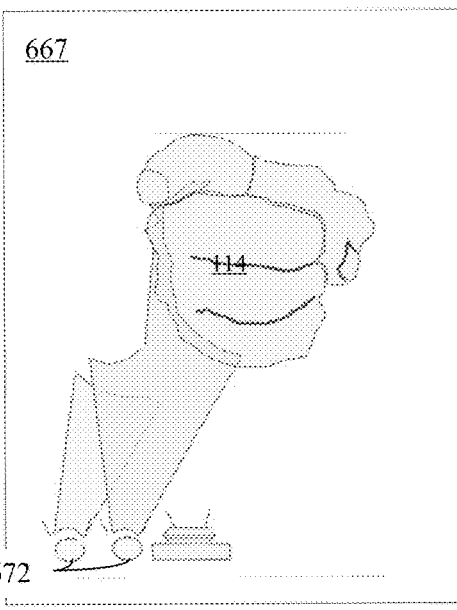

In one implementation 600B, and with reference to block 65 of FIG. 6B, cameras 102, 104 are operated to collect a sequence of images (e.g., 610A, 610B) of the object 114. The images are time correlated such that an image from camera 102 can be paired with an image from camera 104 that was captured at the same time (or within a few milliseconds). These images are then analyzed by an image-analysis module 630; in particular, an object-detection routine detects the presence of one or more objects 650 in the image, and the object-analysis routine analyzes detected objects to determine their positions and shape in 3D space. In an implementation shown in block 66, the analysis routine considers a stack of 2D cross-sections through the 3D spatial field of view of the cameras. These cross-sections are referred to herein as "slices." A slice can be any plane at least part of which is in the field of view of cameras 102, 104. For purposes of motion-capture analysis, slices can be selected at regular intervals in the field of view. For example, if the received images include a fixed number of rows of pixels (e.g., 1080 rows), each row can be a slice, or a subset of the rows can be used for faster processing. Where a subset of the rows is used, image data from adjacent rows can be averaged together, e.g., in groups of two or three. In one implementation shown in block 67, one or more sources of emissions can be directed to object 114 to facilitate collecting observation information.

Again with reference to block 65 in FIG. 6B, one or more rays from the camera(s) can be drawn proximate to an object for some or all of the slices, depending upon the number of vantage points that are available. One or more rays 652 can be determined for some point P on a surface of the body portion 650 of an occupant in an image 610A. A tangent 656 to the body portion surface at the point P can be determined from point P and neighboring points. A normal vector 658 to the body portion surface 650 at the point P is determined from the ray and the tangent by cross product or other analogous technique. In block 68, a model portion (e.g., capsule 687) can be aligned to body portion surface 650 at the point based upon the normal vector 658 and a normal vector 689 of the model portion 687. Optionally, as shown in block 65, a second ray 654 is determined to the point P from a second image 610B captured by a second camera. In some instances, fewer or additional rays or constraints from neighboring capsule placements can create additional complexity or provide further information. Additional information from placing neighboring capsules can be used as constraints to assist in determining a solution for placing the capsule. For example, using one or more parameters from a capsule fit to a slice adjacent to the capsule being placed, e.g., angles of orientation, the system can determine a placement, orientation and shape/size information for the capsule. Slices with too little information to analyze can be discarded or combined with adjacent slices.

In some implementations, each of a number of slices is analyzed separately to determine the size and location of a capsule fitting that slice. This provides an initial 3D model, which can be refined by correlating the cross-sections across different slices. For example, it is expected that an object's surface will have continuity, and discontinuous portions can accordingly be discounted. Further refinement can be obtained by correlating the 3D model with itself across time, e.g., based on expectations related to continuity in motion and deformation.

The modes of operation of the vehicle equipped with a motion sensory control device can determine the coarseness of the data provided to the image-analysis module 630, the coarseness of its analysis, or both in accordance with entries in a performance database. For example, during a wide-area mode of operation, the image-analysis module 630 can operate on every image frame and on all data within a frame, capacity limitations can dictate analysis of a reduced amount of image data per frame (i.e., resolution) or discarding of some frames altogether if the data in each of the frame buffers 610 are organized as a sequence of data lines. The manner in which data is dropped from the analysis can depend on the image-analysis algorithm or the uses to which the motion-capture output is put. In some implementations, data is dropped in a symmetric or uniform fashion—e.g., every other line, every third line, etc. is discarded up to a tolerance limit of the image-analysis algorithm or an application utilizing its output. In other implementations, the frequency of line dropping can increase toward the edges of the frame. Still other image-acquisition parameters that can be varied include the frame size, the frame resolution, and the number of frames acquired per second. In particular, the frame size can be reduced by, e.g., discarding edge pixels or by resampling to a lower resolution (and utilizing only a portion of the frame buffer capacity). Parameters relevant to acquisition of image data (e.g., size and frame rate and characteristics) are collectively referred to as "acquisition parameters," while parameters relevant to operation of the image-analysis module 630 (e.g., in defining the contour of an object) are collectively referred to as "image-analysis parameters." The foregoing examples of acquisition parameters and image-analysis parameters are representative only, and not limiting.

Acquisition parameters can be applied to the camera 600 and/or to the frame buffers 610. The camera 600, for example, can be responsive to acquisition parameters in operating the cameras 102, 104 to acquire images at a commanded rate, or can instead limit the number of acquired frames passed (per unit time) to the frame buffers 610. Image-analysis parameters can be applied to the image-analysis module 630 as numerical quantities that affect the operation of the contour-defining algorithm.

The desirable values for acquisition parameters and image-analysis parameters appropriate to a given level of available resources can depend, for example, on the characteristics of the image-analysis module 630, the nature of the application utilizing the mocap output, and design preferences. Whereas some image-processing algorithms can be able to trade off a resolution of contour approximation against input frame resolution over a wide range, other algorithms may not exhibit much tolerance at all requiring, for example, a minimal image resolution below which the algorithm fails altogether.

Gesture-Recognition Sensor

Figure 7A:
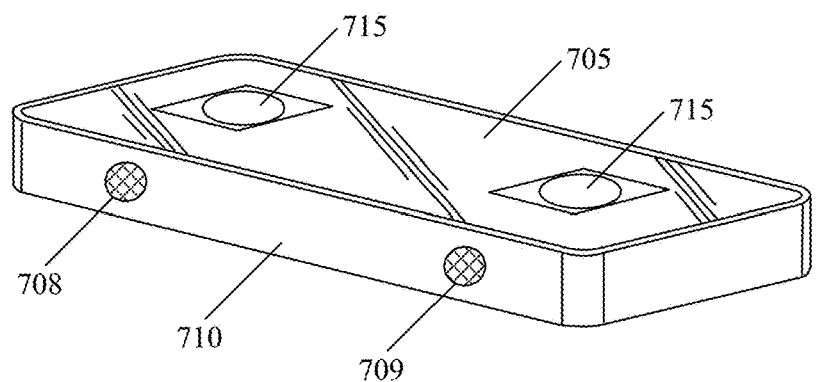
FIG. 7A is a perspective view from the top of a motion sensory control device in accordance with the technology disclosed, with motion sensors along an edge surface thereof.
Figure 7B:
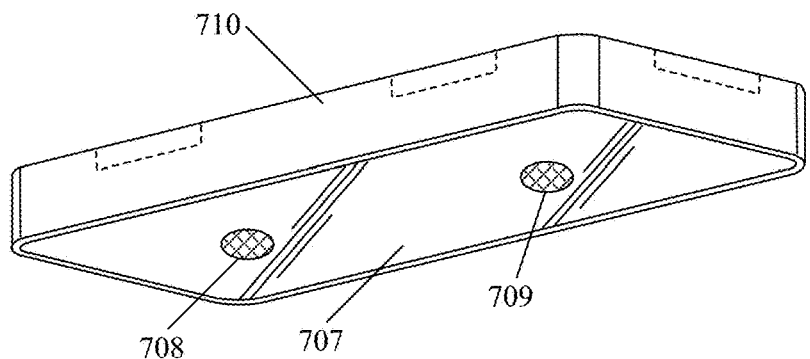
FIG. 7B is a perspective view from the bottom of a motion sensory control device in accordance with the technology disclosed, with motion sensors along the bottom surface thereof.
Figure 7C:
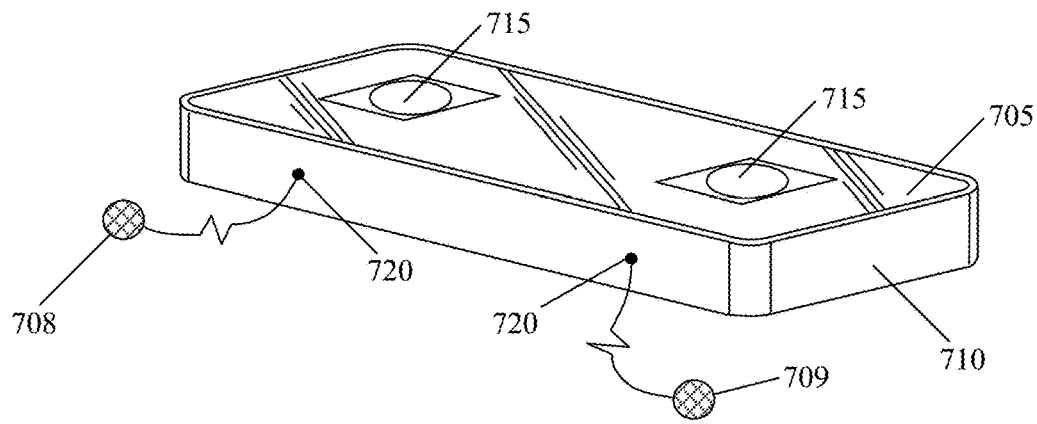
FIG. 7C is a perspective view from the top of a motion sensory control device in accordance with the technology disclosed, with detachable motion sensors configured for placement on a surface.

FIGS. 7A, 7B, and 7C illustrate three different configurations of a motion sensory control device 700, with reference to example implementations packaged within a single housing as an integrated sensor. In all cases, motion sensory control device 700A, 700B, 700C includes a top surface 705, a bottom surface 707, and a side wall 710 spanning the top and bottom surfaces 705, 707. With reference also to FIG. 7A, the top surface 705 of motion sensory control device 700A contains a pair of windows 715 for admitting light to the cameras 102, 104, one of which is optically aligned with each of the windows 715. If the system includes light sources 108, 110 (not shown in the figure for clarity sake), surface 705 may contain additional windows for passing light to the object(s) being tracked. In motion sensory control device 700A, optional motion sensors 708, 709 are located on the side wall 710. Desirably, the motion sensors are flush with the surface of side wall 710 so that, the motion sensors are disposed to sense motions about a longitudinal axis of motion sensory control device 700A. Of course, the motion sensors can be recessed from side wall 710 internal to the device in order to accommodate sensor operation and placement within available packaging space so long as coupling with the external housing of motion sensory control device 700A remains adequate. In sensor 700B, sensors 708, 709 are located proximate to the bottom surface 707, once again in a flush or recessed configuration. The top surface of the motion sensory control device 700B (not shown in the figure for clarity sake) contains camera windows 715 as shown in FIG. 7A. In FIG. 7C, sensors 708, 709 are external contact transducers that connect to motion sensory control device 700C via jacks 720. This configuration permits the motion sensors to be located away from the motion sensory control device 700C, e.g., if the motion sensors are desirably spaced further apart than the packaging of motion sensory control device 700C allows.

In other implementations, movable sensor components of FIG. 1B can be imbedded in portable (e.g., head mounted devices (HMDs), wearable goggles, watch computers, smartphones, and so forth) or movable (e.g., autonomous robots, material transports, automobiles (human or machine driven)) devices.

A motion-capture system captures movement of a user, a portion of the user's body (often one or more of the user's hands) and/or object in 3D space using a computing device connected to one or more cameras. Once movement is captured, the computing device can interpret the movement as a user-input command and update a computer display accordingly. For example, the computer display can illustrate a virtual representation of the user's hands and update that representation as the user moves his hands. In another example, the computer display can illustrate a virtual object that is manipulated (e.g., rotated or resized) as the user's hands move.

Processing a sequence of captured images quickly enough to detect and characterize objects therein (e.g., in terms of their contours), and track their motions through the image sequence in real time, requires substantial computational resources, which is of special concern when the motion sensory control device is embedded in smart phones that have power limitations. In order to accurately track motion in real or near-real time, the camera(s) of motion-capture systems typically operate at a frame rate of at least 15 image frames per second. Image acquisition at such high rates entails significant power requirements; in general, there is a trade-off between the frame-rate-dependent accuracy and responsiveness of motion-capture systems on the one hand and power consumption on the other hand. Power requirements, however, can pose a practical limit to the range of applications of motion-capture systems like smart phones equipped with motion sensory control devices, as excessive power consumption can render their employment impractical or economically infeasible. It would therefore be desirable to reduce power consumption of smart phones equipped with motion sensory control devices, preferably in a manner that does not affect motion-tracking performance.

This is achieved by monitoring at least one physical and/or environmental parameter of a smart phone equipped with a motion sensory control device and in response to detection of a change in the physical and/or environment parameter exceeding a specified threshold, automatically switching the smart phone from one operation mode to another such as a high-power consumption mode to a low-power consumption mode.

Flowchart

Figure 10:
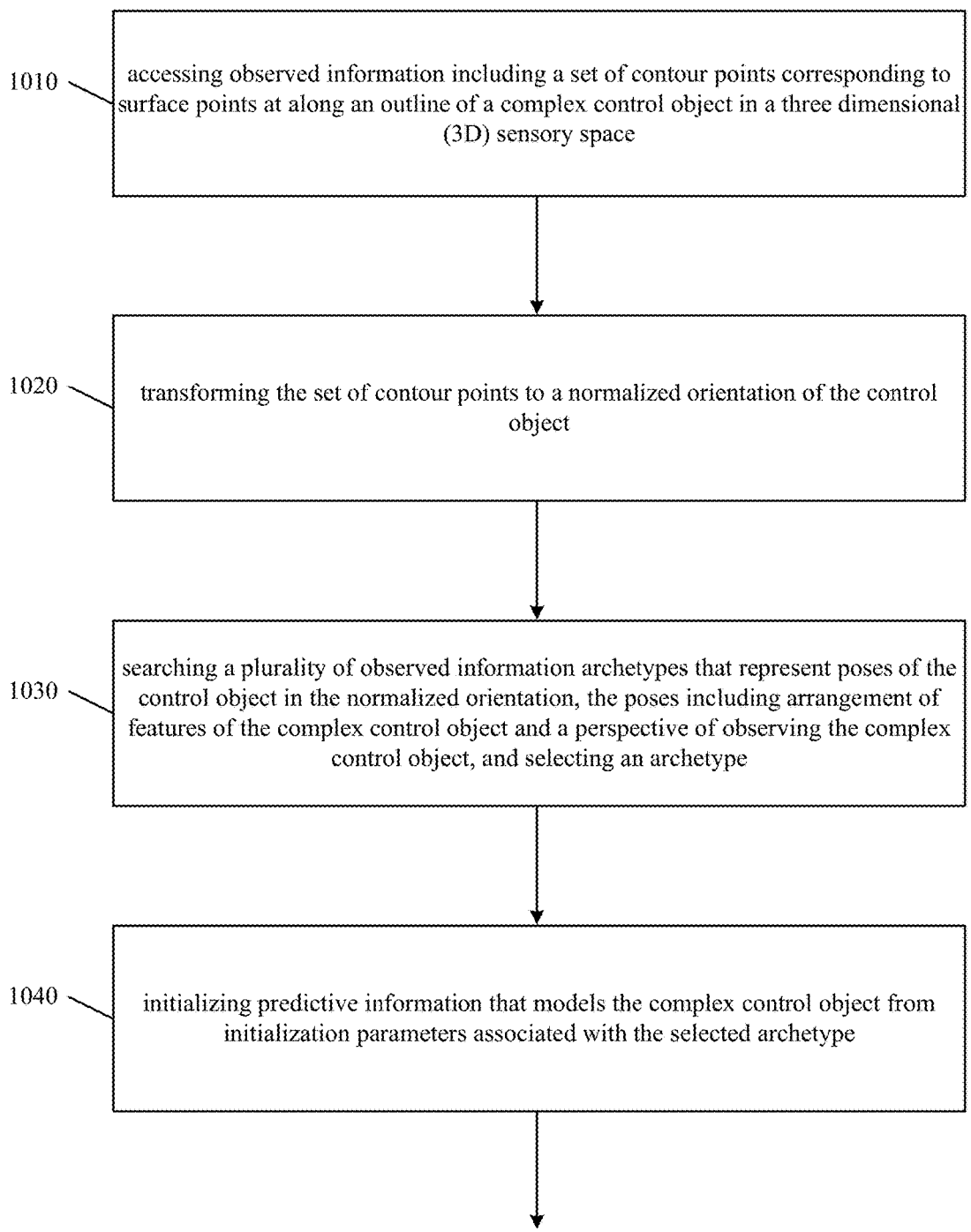
FIG. 10 shows a flowchart of one implementation of initializing predictive information that models a complex control object in a three dimensional (3D) sensory space.

FIG. 10 shows a flowchart 1000 of one implementation of initializing predictive information that models a complex control object in a three dimensional (3D) sensory space. Flowchart 1000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this flowchart is described with reference to the system that carries out a method. The system is not necessarily part of the method.

At action 1010, observed information including a set of contour points corresponding to surface points at along an outline of a complex control object in a three dimensional (3D) sensory space is accessed. For example, observed information can be obtained from sensory analysis system 106 that captures one or more images of hand 114. The images can be analyzed and contour point set(s) can be extracted.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as in different sections of this application such as gesture-recognition system, capsule hand, initialization, scaling, orientation, initialization refinement, refining, normalizing and comparing, association, alignment, correction, abstracting, determining and interpreting command identification, image capture, gesture-recognition sensor, and/or flowchart.

At action 1020, the set of contour points is transformed to a normalized orientation of the control object. In some implementations, normalizing orientation of the complex control object further includes at training time t0, sensing an actual position of at least one complex control object in a first reference frame of the 3D sensory space. It includes, at initialization time t1, sensing, in the 3D sensory space, an apparent position of the complex control object different from the actual position, wherein the complex control object has not moved in the 3D sensory space between t0 and t1. It also includes calculating a second reference frame that accounts for apparent position of the complex control object and calculating a transformation that renders the actual position in the first reference frame and the apparent position in the second reference frame into a common reference frame. It further includes transforming the actual and apparent positions of the complex control object into the common reference frame, wherein the common reference frame has a fixed point of reference and an initial orientation of axes, whereby the sensed apparent position is transformed to an actual position. In one implementation, the common reference frame is a world reference frame that does not change.

In other implementations, the transforming the actual and apparent positions of the complex control object into the common reference frame further includes applying an affine transformation.

In yet other implementations, the transforming further includes at least one of applying a vector to the set of contour points and applying a rotation matrix to the set of contour points.

In one implementation, the orientation of the complex control object is determined at the actual position with respect to the first reference frame. In another implementation, the orientation of the complex control object is determined at the apparent position with respect to the second reference frame.

In one implementation, a position of the complex control object is determined at the actual position by calculating a translation of the complex control object with respect to the common reference frame. In another implementation, a position of the complex control object is determined at the apparent position by calculating a translation of the complex control object with respect to the common reference frame.

At action 1030, a plurality of observed information archetypes is searched that represent poses of the control object in the normalized orientation and an archetype is selected. The poses include arrangement of features of the complex control object and a perspective of observing the complex control object.

In some implementations, the searching further includes traversing a linked data structure including the plurality of observed information archetypes. In one implementation, the traversing further includes visiting a node in the data structure, comparing the transformed contour points sets to one or more pluralities of observed information archetypes associated with the node, and selecting, from the pluralities, at least one archetype having highest conformance with the transformed contour points sets of the control object.

In other implementations, the linked data structure includes a plurality of nodes representing observed information archetypes in parent-child relationship and the traversing further includes visiting a plurality of parent nodes, each parent node in the plurality identifying one or more variants of one or more poses, and calculating a ranked list of parent nodes having highest conformance with the transformed contour points sets of the control object and visiting a plurality of child nodes related to the parent nodes in the ranked list, each child node identifying one or more variants of one or more poses different from the one or more poses of the parent nodes, and calculating a ranked list of child nodes having highest conformance with the transformed contour points sets of the control object.

At action 1040, predictive information is initialized that models the complex control object from initialization parameters associated with the selected archetype. The predictive information can include an estimated model (or proto-model). The proto-model size and orientation can be set using the techniques described herein with reference to FIGS. 3A, 3B, 3C, 3D, 3E, and 3F. Alternatively, or additionally, a previously initialized model can be used as a proto-model. In another alternative, a default configuration having a default size and orientation can be used as the proto-model.

The initializing predictive information further includes aligning one or more model portions based at least in part upon one or more initialization parameters associated with the selected archetype. In flowchart 1000, according to some other implementations, initialization engine 160 of FIG. 1B of sensory analysis system 106 preforms refinement processing on a model component of predictive information automatically based upon imaging of the control object being modelled, and collected observations of like objects in a variety of possible poses and configurations.

In one implementation, the complex control object is a hand and the initialization parameters include edge information for at least fingers of the hand.

In another implementation, the complex control object is a hand and the initialization parameters include edge information for a palm of the hand.

In yet another implementation, the complex control object is a hand and the initialization parameters include finger segment length information for fingers of the hand.

In yet further implementation, the complex control object is a hand and the initialization parameters include at least one of one or more joint angles between finger segments of fingers of the hand, a pitch angle between finger segments of fingers of the hand, and a yaw angle between finger segments of fingers of the hand.

In a further implementation, the complex control object is a hand and the initialization parameters include joint angle and segment orientation information of the hand.

In another implementation, the complex control object is a hand and the initialization parameters include a distance between adjoining base points of fingers of the hand.

In an implementation, the complex control object is a hand and the initialization parameters include a ratio of distance between adjoining base points of fingers of the hand to minimal distance between adjoining base points of the fingers.

In a further implementation, the complex control object is a hand and the initialization parameters include an angle between adjacent fingers of the hand.

In one implementation, the complex control object is a hand and the initialization parameters include a joint angle between adjacent finger segments of the hand.

In yet another implementation, the complex control object is a hand and the initialization parameters include a ratio of hand's fingers' thickness to a maximal finger's thickness.

In yet further implementation, the complex control object is a hand and the initialization parameters include span lengths between opposing sides of the hand.

In another implementation, the complex control object is a hand and the initialization parameters include at least one of finger diameter length fingers of the hand, palm length of palm of the hand, palm to thumb distance of the hand, wrist length of wrist of the hand, and wrist width of wrist of the hand.

In yet another implementation, the complex control object is a hand and the method further includes using the selected archetype to determine at least one of whether one or more fingers of the hand are extended or non-extended, one or more angles of bend for one or more fingers, a direction to which one or more fingers point, and a configuration indicating a pinch, a grab, an outside pinch, or a pointing finger.

In some other implementation, the complex control object is an automobile and the initialization parameters include at least one of cabin of the automobile, windshield to rear distance of the automobile, front bumper to rear bumper distance of the automobile, and distance between front of a tire and rear of the tire of the automobile.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of initializing predictive information that models a complex control object in a three dimensional (3D) sensory space, the method including:
    accessing observed information including a set of contour points corresponding to surface points along an outline of a complex control object in a three dimensional (3D) sensory space;
    sensing an actual position of at least one complex control object in a first reference frame of the 3D sensory space;
    sensing an apparent position of the complex control object, wherein the apparent position sensed is different from the actual position sensed; wherein the complex control object has not moved in the 3D sensory space;
    calculating a second reference frame that accounts for apparent position of the complex control object;
    calculating a transformation that renders the actual position in the first reference frame and the apparent position in the second reference frame into a common reference frame; and
    transforming the actual and apparent positions of the complex control object into the common reference frame, whereby the sensed apparent position is transformed to an actual position and the set of contour points is transformed to a normalized orientation of the control object;
    searching a plurality of observed information archetypes that represent poses of the control object in the normalized orientation, the poses including arrangement of features of the complex control object and a perspective of observing the complex control object, and selecting an archetype; and
    initializing predictive information that models the complex control object from initialization parameters associated with the selected archetype.

2. The method of claim 1, wherein the common reference frame has a fixed point of reference and an initial orientation of axes.

3. The method of claim 1, wherein the common reference frame is a world reference frame that does not change.

4. The method of claim 1, wherein the transforming the actual and apparent positions of the complex control object into the common reference frame further includes applying an affine transformation.

5. The method of claim 1, further including determining the orientation of the complex control object at the actual position with respect to the first reference frame.

6. The method of claim 1, further including determining the orientation of the complex control object at the apparent position with respect to the second reference frame.

7. The method of claim 1, further including determining a position of the complex control object at the actual position by calculating a translation of the complex control object with respect to the common reference frame.

8. The method of claim 1, further including determining a position of the complex control object at the apparent position by calculating a translation of the complex control object with respect to the common reference frame.

9. The method of claim 1, wherein the searching further includes traversing a linked data structure including the plurality of observed information archetypes.

10. The method of claim 9, wherein the traversing further includes:
    visiting a node in the data structure;
    comparing the transformed contour points sets to one or more pluralities of observed information archetypes associated with the node; and
    selecting, from the pluralities, at least one archetype having highest conformance with the transformed contour points sets of the control object.

11. The method of claim 9, wherein the linked data structure includes a plurality of nodes representing observed information archetypes in parent-child relationship and the traversing further includes:
    visiting a plurality of parent nodes, each parent node in the plurality identifying one or more variants of one or more poses, and calculating a ranked list of parent nodes having highest conformance with the transformed contour points sets of the control object; and
    visiting a plurality of child nodes related to the parent nodes in the ranked list, each child node identifying one or more variants of one or more poses different from the one or more poses of the parent nodes, and calculating a ranked list of child nodes having highest conformance with the transformed contour points sets of the control object.

12. The method of claim 1, wherein the initializing predictive information further includes:
    aligning one or more model portions based at least in part upon one or more initialization parameters associated with the selected archetype.

13. The method of claim 1, wherein the complex control object is a hand and the initialization parameters include:
    at least one of:
        edge information for at least fingers of the hand;
        edge information for a palm of the hand;
        finger segment length information for fingers of the hand;
        joint angle and segment orientation information of the hand;
        a distance between adjoining base points of fingers of the hand;
        a ratio of distance between adjoining base points of fingers of the hand to minimal distance between adjoining base points of the fingers;

one or more joint angles between finger segments of fingers of the hand;
a pitch angle between finger segments of fingers of the hand; and
a yaw angle between finger segments of fingers of the hand.

14. The method of claim 1, wherein the complex control object is a hand and the poses identify:
at least one of:
an angle between adjacent fingers of the hand;
a joint angle between adjacent finger segments of the hand;
a ratio of hand's fingers' thickness to a maximal finger's thickness;
span lengths between opposing sides of the hand;
finger diameter length fingers of the hand;
palm length of palm of the hand;
palm to thumb distance of the hand;
wrist length of wrist of the hand; and
wrist width of wrist of the hand.

15. The method of claim 1, wherein the complex control object is a hand and further including:
using the selected archetype to determine at least one of:
whether one or more fingers of the hand are extended or non-extended;
one or more angles of bend for one or more fingers;
a direction to which one or more fingers point; and
a configuration indicating a pinch, a grab, an outside pinch, or a pointing finger.

16. The method of claim 1, wherein the complex control object is an automobile and the initialization parameters include:
at least one of:
cabin of the automobile;
windshield to rear distance of the automobile;
front bumper to rear bumper distance of the automobile; and
distance between front of a tire and rear of the tire of the automobile.

17. A non-transitory computer readable medium having instructions to initialize predictive information that models a complex control object in a three dimensional (3D) sensory space stored thereon, which instructions when executed by a processor, perform a method including:
accessing observed information including a set of contour points corresponding to surface points along an outline of a complex control object in a three dimensional (3D) sensory space;
sensing an actual position of at least one complex control object in a first reference frame of the 3D sensory space;
sensing an apparent position of the complex control object, wherein the apparent position sensed is different from the actual position sensed; wherein the complex control object has not moved in the 3D sensory space;
calculating a second reference frame that accounts for apparent position of the complex control object;
calculating a transformation that renders the actual position in the first reference frame and the apparent position in the second reference frame into a common reference frame; and
transforming the actual and apparent positions of the complex control object into the common reference frame, whereby the sensed apparent position is transformed to an actual position and the set of contour points is transformed to a normalized orientation of the control object;
searching a plurality of observed information archetypes that represent poses of the control object in the normalized orientation, the poses including arrangement of features of the complex control object and a perspective of observing the complex control object, and selecting an archetype; and
initializing predictive information that models the complex control object from initialization parameters associated with the selected archetype.

18. A system including:
an optical sensor; a processors; and a memory, the memory storing instructions to initialize predictive information that models a complex control object in a three dimensional (3D) sensory space, which instructions when executed by the processor perform a method including:
accessing observed information including a set of contour points corresponding to surface points along an outline of a complex control object in a three dimensional (3D) sensory space;
sensing an actual position of at least one complex control object in a first reference frame of the 3D sensory space;
sensing an apparent position of the complex control object, wherein the apparent position sensed is different from the actual position sensed; wherein the complex control object has not moved in the 3D sensory space;
calculating a second reference frame that accounts for apparent position of the complex control object;
calculating a transformation that renders the actual position in the first reference frame and the apparent position in the second reference frame into a common reference frame; and
transforming the actual and apparent positions of the complex control object into the common reference frame, whereby the sensed apparent position is transformed to an actual position and the set of contour points is transformed to a normalized orientation of the control object;
searching a plurality of observed information archetypes that represent poses of the control object in the normalized orientation, the poses including arrangement of features of the complex control object and a perspective of observing the complex control object, and selecting an archetype; and
initializing predictive information that models the complex control object from initialization parameters associated with the selected archetype.

19. A method of initializing predictive information that models a complex control object in a three dimensional (3D) sensory space, the method including:
accessing observed information including a set of contour points corresponding to surface points at along an outline of a complex control object in a three dimensional (3D) sensory space;
transforming the set of contour points to a normalized orientation of the control object;
wherein normalizing orientation of the complex control object further includes:
at training time t0, sensing an actual position of at least one complex control object in a first reference frame of the 3D sensory space;
at initialization time t1, sensing, in the 3D sensory space, an apparent position of the complex control object different from the actual position, wherein the complex control object has not moved in the 3D sensory space between t0 and t1;

calculating a second reference frame that accounts for apparent position of the complex control object;

calculating a transformation that renders the actual position in the first reference frame and the apparent position in the second reference frame into a common reference frame; and transforming the actual and apparent positions of the complex control object into the common reference frame, wherein the common reference frame has a fixed point of reference and an initial orientation of axes, whereby the sensed apparent position is transformed to an actual position;

searching a plurality of observed information archetypes that represent poses of the control object in the normalized orientation, the poses including arrangement of features of the complex control object and a perspective of observing the complex control object, and selecting an archetype; and initializing predictive information that models the complex control object from initialization parameters associated with the selected archetype.

* * * * *